(12) United States Patent
Iwase et al.

(10) Patent No.: US 8,511,408 B2
(45) Date of Patent: Aug. 20, 2013

(54) CONTROL DEVICE FOR VEHICLE DRIVING APPARATUS

(75) Inventors: Yuji Iwase, Mishima (JP); Takuma Kakinami, Toyota (JP); Atsushi Tabata, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 889 days.

(21) Appl. No.: 11/979,612

(22) Filed: Nov. 6, 2007

(65) Prior Publication Data
US 2008/0120011 A1 May 22, 2008

(30) Foreign Application Priority Data
Nov. 9, 2006 (JP) .................................. 2006-304538

(51) Int. Cl.
*B60W 10/00* (2006.01)
(52) U.S. Cl.
USPC .................................................... 180/65.285
(58) Field of Classification Search
USPC ................. 180/65.21, 65.275, 65.28, 65.285; 701/111
See application file for complete search history.

(56) References Cited

U.S. PATENT DOCUMENTS

| | | | | |
|---|---|---|---|---|
| 5,499,302 A | * | 3/1996 | Nagami et al. | 381/71.4 |
| 6,408,968 B1 | * | 6/2002 | Wakashiro et al. | 180/65.26 |
| 7,584,743 B2 | * | 9/2009 | Godbold | 123/399 |
| 2006/0144365 A1 | * | 7/2006 | Miyashita | 123/431 |

FOREIGN PATENT DOCUMENTS

| | | |
|---|---|---|
| JP | A-2000-110926 | 4/2000 |
| JP | A-2000-282910 | 10/2000 |
| JP | A-2002-321549 | 11/2002 |
| JP | A-2003-127679 | 5/2003 |
| JP | A-2005-199971 | 7/2005 |
| JP | A-2006-231977 | 9/2006 |

OTHER PUBLICATIONS

Office Action issued in Japanese Patent Application No. 2006-304538 mailed on Sep. 6, 2011. (with English language translation).

* cited by examiner

*Primary Examiner* — Katy M Ebner
(74) *Attorney, Agent, or Firm* — Oliff & Berridge, PLC

(57) ABSTRACT

The present invention provides, in a vehicle driving apparatus that includes an internal combustion engine 6 and electric motors M1 and M2, a control device that can provide both confined noise reduction and fuel efficiency improvement. A control device 40 includes a confined noise reduction means 98 that controls the electric motor, to reduce confined noise caused by the variation of torque that is provided from the internal combustion engine, so that the electric motor provides variation of torque in opposite phase to the variation of the torque that is provided from the internal combustion engine.

8 Claims, 14 Drawing Sheets

|  | C1 | C2 | B1 | B2 | B3 | SHIFTING RATIO | STEP |
|---|---|---|---|---|---|---|---|
| 1st | O |  |  |  | O | 3.357 | 1.54 |
| 2nd | O |  |  | O |  | 2.180 | 1.53 |
| 3rd | O |  | O |  |  | 1.424 | 1.42 |
| 4th | O | O |  |  |  | 1.000 | 1.42 |
| 5th |  | O |  | O |  | 0.705 | TOTAL |
| R |  | O |  |  | O | 3.209 | 4.76 |
| N |  |  |  |  |  |  |  |

O ENGAGED

|  | C1 | C2 | B1 | B2 | SHIFTING RATIO | STEP |
|---|---|---|---|---|---|---|
| 1st | ○ |  |  | ○ | 2.804 | 1.54 |
| 2nd | ○ |  | ○ |  | 1.531 | 1.53 |
| 3rd | ○ | ○ |  |  | 1.000 | 1.42 |
| 4th | ○ | ○ |  |  | 0.705 | TOTAL |
| R |  | ○ |  | ○ | 2.393 | 3.977 |
| N |  |  |  |  |  |  |

○ ENGAGED

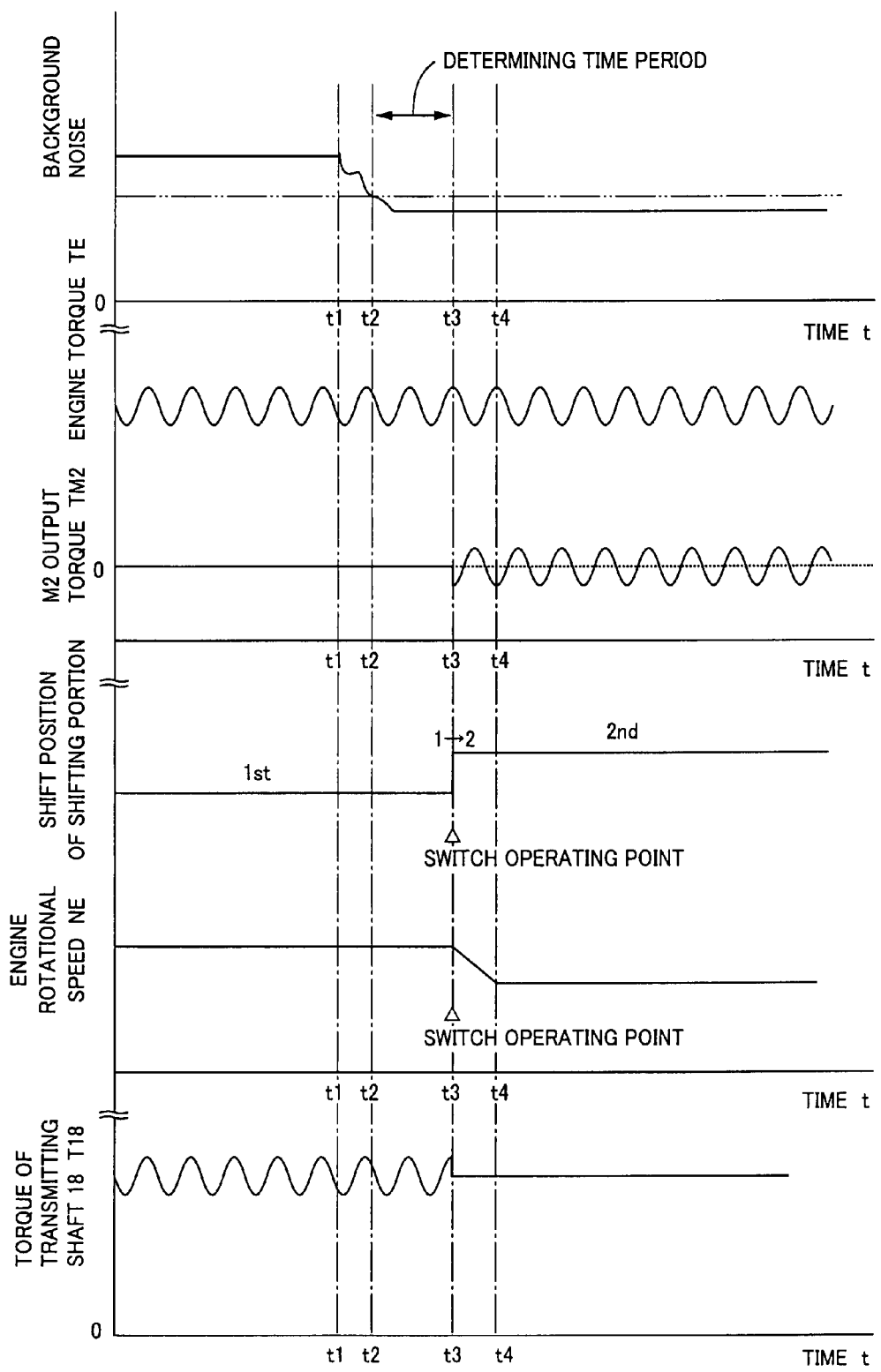

CONTROL DEVICE FOR VEHICLE DRIVING APPARATUS

BACKGROUND OF THE INVENTION

1. Field of the Invention

The present invention relates to a technology that, in a vehicle driving apparatus including an internal combustion engine and an electric motor, reduces confined noise caused by variation of the torque outputted from the internal combustion engine.

2. Description of Related Art

Vehicle driving apparatuses are known which include a differential mechanism that distributes engine output to a first motor and an output shaft, and a second motor that is arranged between the output shaft of the differential mechanism and the drive wheels. An example of a vehicle driving apparatus is provided by the hybrid vehicle driving apparatus disclosed in Patent Document 1 (Japanese Patent Laid-Open Publication No. 2003-127679). In this type of hybrid vehicle driving apparatus, a differential mechanism is composed of a planetary gear device, for example, which mechanically transfers a main part of the power from the engine to the drive wheels by differential action.

The rest of the power from the engine is electrically transferred from the first motor to the second motor via an electrical path. Accordingly, the vehicle driving apparatus serves as a transmission that allows the differential mechanism to electrically change its transmission ratio, just as an electrical continuously variable transmission does. As a result, a control device controls the vehicle driving apparatus to drive the vehicle while keeping the engine in an optimal operating state, thereby improving fuel efficiency.

Generally, various types of vibration and noise are generated in vehicles. For example, various types of vibration and noise are generated by periodic cylinder ignition (explosion) in an engine, and the rotational variation caused by variation of engine torque in the reciprocating motion of pistons, both acting as a forcing source (also acting as a vibration source or forcedly vibrating force). Vibration is transmitted to other parts and systems of a vehicle, such as an engine suspension system, an exhaust pipe system, and a bodywork system. The engine suspension system is composed of a power mount and an engine mount. The power mount couples an engine to a transmission (or transaxle), and the like. The transmitted vibration is amplified by the phenomenon of resonance in the systems of the vehicle. Thus, vibration and confined noise are generated in individual sections of the vehicle.

It is well known that the phenomenon of resonance occurs within a specific engine rotational speed range as a resonance range. For example, the resonance range may correspond to a specific engine rotational speed range where engine rotational speed is less than idle rotational speed. When the rotational speed of the engine increases upon engine starting, the rotational speed of the engine will reach that specific engine rotational speed range. In this case, the resonance phenomenon may occur.

Reducing confined noise generated in this way has been tried for improving comfort and quietness in vehicles, but the standards required have been set higher in recent years. In hybrid vehicles, any change in the characteristics of a damper is limited by its specifications, for example. Reduction of such confined noise by hardware is limited.

Another technology is disclosed in Patent Document 2 (Japanese Patent Laid-Open Publication No. 2005-199971) which suppresses confined noise. In the technology, in relation to operation lines of an internal-combustion engine, that is, lines that represent the relation between target rotational speed and target torque as target operation points, in addition to an operation line for fuel consumption to provide good fuel efficiency, an operation line for confined noise suppression to suppress confined noise is provided. If confined noise is generated, the internal combustion engine is operated with the switched operation line for confined noise suppression, alternatively a motor provides compensation torque that vibrates in opposite phase to the phase of torque generated by the vibration associated with the rotational speed of an engine.

However, in the method of the Patent Document 2, the following problems arise. In the switched operation line for confined noise suppression, the internal combustion engine is operated without consideration for fuel efficiency. In addition to this, outputting the compensation torque in opposite phase consumes battery power, arising energy loss. For this reason, fuel efficiency is reduced. Furthermore, in the case where a battery has limited capacity to receive and provide power under low temperature, for example, this method is not feasible.

SUMMARY OF THE INVENTION

The present invention has been made in consideration of the above situations, and its object is to provide, in a vehicle driving apparatus that includes an internal combustion engine and a motor, a control device that includes a confined noise detecting means that detects confined noise caused by variation of the torque outputted from the internal combustion engine, and can achieve both a reduction of the confined noise and a fuel efficiency improvement.

The present invention is featured by that a control device for a vehicle driving apparatus that includes an internal combustion engine and an electric motor, the control device comprising: confined noise reduction means that controls said electric motor, to reduce confined noise caused by variation of torque outputted from said internal combustion engine, so that the electric motor outputs variation of torque in opposite phase to the variation of the torque outputted from said internal combustion engine.

According to the present invention, when confined noise is generated by the internal combustion engine, the confined noise reduction means controls the electric motor to provide variation of torque in opposite phase to the variation of the torque that is provided by the internal combustion engine. In this configuration, the electric motor is not required to constantly output torque, but output torque only if confined noise is generated. Thus, the reduction in fuel efficiency is prevented. In addition to this, since the torque outputted from the electric motor can suppress the variation of torque of the internal combustion engine, changing an operation line is not required.

The confined noise reduction means controls the electric motor if the confined noise caused by the variation of the torque is larger than background noise. The confined noise reduction means does not constantly control the electric motor when confined noise is generated, but controls the electric motor only when necessary. Thus, energy loss caused by control of the electric motor can be minimized.

The confined noise reduction means preferably controls the electric motor if a driver does not issue a low fuel consumption requirement. In this configuration, when a driver does not issue a low fuel consumption requirement, the electric motor is controlled, and when the driver issues the low fuel consumption requirement, the electric motor is not controlled. Therefore, the fuel efficiency of the internal combustion engine is not worsened.

Also, the confined noise reduction means preferably includes a rotational speed control means that, if the electric motor cannot operate, adjusts the rotational speed of the internal combustion engine into a non-confined noise generating operation area not generating the confined noise, within an operating area in which the internal combustion engine can operate. Examples of malfunction of the electric motor includes a voltage drop or power shortage in the batteries, and overheating of the electric motor. Even when the electric motor cannot operate by driver in an intentional direction for operation stopping, the rotational speed control means controls the number of rotations of the internal combustion engine, causing the revolutions to fall within the non-confined noise generating drive area such that the confined noise is not generated. Consequently, the generation of confined noise can be suppressed.

The control device further includes an automatic transmission that is arranged on a power transmission path that transfers the output of the internal combustion engine and the electric motor to driving wheels, wherein the rotational speed control means changes the shifting ratio of the automatic transmission so that the rotational speed of the internal combustion engine falls within the non-confined noise generating operation area. The rotational speed control means changes the shifting ratio i.e., gear ratio of the automatic transmission installed in a vehicle, and thus easily adjusts the rotational speed of the internal combustion engine to be within the non-confined noise generating operation area, such that confined noise is not generated. Consequently, the generation of confined noise can be suppressed.

The control device preferably controls the electric motor if a shift lever installed in a vehicle is set at a predetermined position. In this configuration, if the shift lever is set at positions other than that predetermined position, the control of the electric motor is not executed. Consequently, unexpected control of the electric motor against the driver's intension is avoided.

The automatic transmission preferably includes a differential portion as a continuously variable shifting portion, and an automatic shifting portion as a step variable shifting portion. The control device changes the shifting ratio of the continuously variable shifting portion or the gear stage of the automatic shifting portion, or changes both of them to change the shifting ratio of the automatic transmission as a whole. Thus, the shifting ratio of the automatic transmission is changed as a whole, and the rotational speed of the internal combustion engine is adjusted to be within the non-confined noise generating operation area such that confined noise is not generated. Consequently, the generation of confined noise can be suppressed.

The control device preferably, comparing the confined noise detected by a confined noise detection means with the background noise detected by a background noise detection means, controls the electric motor, if the level of the background noise has the level that makes the confined noise serious or problematic. Since the control is not always executed for the detection of confined noise but is executed only if required, energy loss used for control of the electric motor can be minimized.

BRIEF DESCRIPTION OF THE DRAWINGS

FIG. 17 is a timing chart showing the state where electric motor control means and rotational speed control means of confined noise reduction means execute control to reduce confined noise.

DETAILED DESCRIPTION OF THE PREFERRED EMBODIMENTS

Embodiment 1

The following description describes an embodiment according to the present invention with reference to the drawings.

Figures 1, 2:
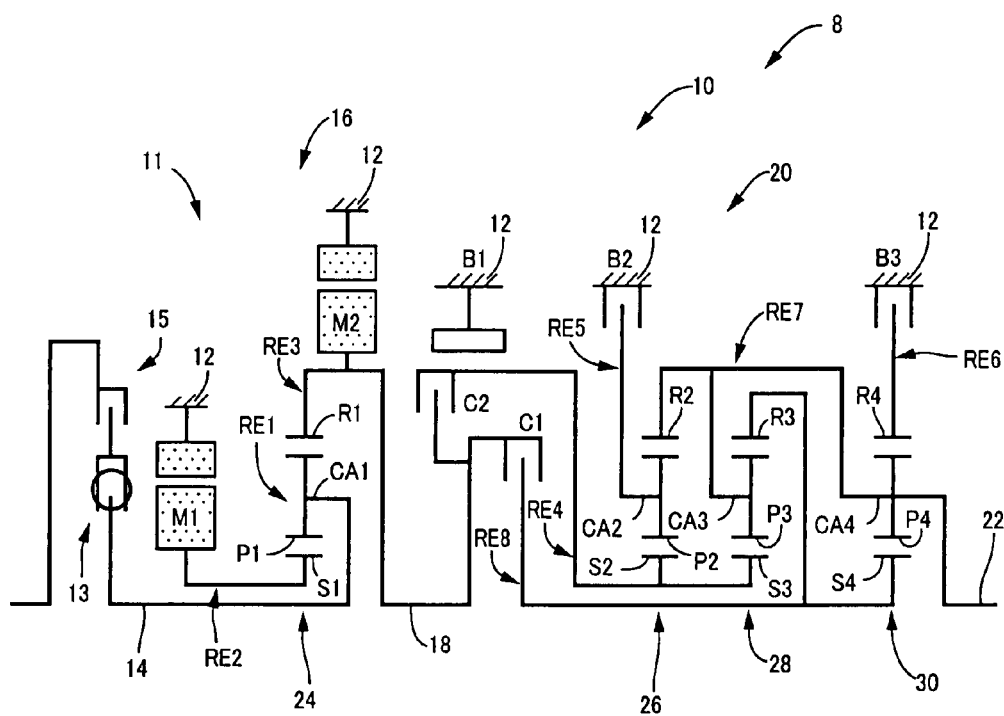
FIG. 1 is a view schematically illustrating the configuration of a hybrid vehicle driving apparatus according to an embodiment of the present invention.
FIG. 2 is an operation table i.e., engagement table explaining the operational combinations of a hydraulic friction engaging device that is used for a shifting operation of the vehicle driving apparatus shown in FIG. 1.

FIG. 1 is a skeleton view explaining a shifting mechanism 10 constructing a part of a drive apparatus of a hybrid vehicle according to one embodiment of the present invention. The shifting mechanism 10 includes an input shaft 14, a differential portion 11, an automatic transmission portion i.e., shifting portion 20, and an output shaft 22 all coaxially disposed in a transmission case 12 (hereinafter briefly referred to as "case 12") as a non-rotatable member fixed to a vehicle body. The input shaft 14 as an input rotation member is fixed to the case 12. The differential portion 11 is connected to the input shaft 14 directly or indirectly via a pulsation absorbing damper (vibration damping device) not shown. The automatic transmission portion 20 functioning as a step-variable type transmission is disposed between the differential mechanism 11 and the output shaft 22 to be connected thereto in series. The output shaft 22 as an output rotation member is connected to the automatic transmission portion 20.

This shifting mechanism 10 of this embodiment is suitably used for a transverse FR vehicle (front-engine, rear-drive vehicle). It is disposed between a drive power source in the form of an engine (not shown) such as a gasoline engine or a diesel engine connected to an input shaft 14 via a pulsation damper 13 and a torque limiter 15, and a pair of drive wheels (not shown), to transmit a vehicle drive force to the pair of drive wheels through a differential gear device 36 (final speed reduction gear), not shown, and a pair of drive axles.

In the shifting mechanism 10 of this embodiment, the engine 8 and the differential portion 11 is directly connected. Here, "the direct connection" includes, in addition to a connection without using any fluid-type transmitting device such as a torque converter or fluid engaging, a connection with using vibration damping, device. Noted that a lower half of the shifting mechanism 10, constructed symmetrically with respect to its axis, is omitted in FIG. 1. This is true for other embodiments to be explained hereinafter.

The differential portion 11 includes a first electric motor M1, a power distributing mechanism 16 and a second electric motor M2. The power distributing mechanism 16 is a mechanism for distributing an output of the engine inputted to the input shaft 14 to the first electric motor M1 and the transmitting member 18, as the differential mechanism. The second electric motor M2, being rotatable integral with the transmitting member 18, may be disposed at any portion of a power transmitting path extending between the transmitting member 18 and the drive wheel 38.

In the present embodiment, each of the first electric motor M1 and the second electric motor M2 is a so-called motor/generator also functioning as an electric generator. The first electric motor M1 should function at least as an electric generator to generate an electric energy with generating a reaction force, and the second electric motor M2 should function at least as an electric motor to generate a drive force of the vehicle.

The power distributing mechanism 16 includes a first planetary gear unit 24 functioning as a differential device. The first planetary gear unit 24 of single pinion type has a gear ratio ρ1 of about 0.418, for example. It has, as rotary elements, a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Assuming the numbers of teeth of the first sun gear S1 and the first ring gear R1 by ZS1 and ZR1, respectively, the above gear ratio ρ1 is represented by ZS1/ZR1.

In the power distributing mechanism 16, the first carrier CA1 is connected to the input shaft 14, i.e., to the engine (not shown), the first sun gear S1 is connected to the first electric motor M1, and the first ring gear R1 is connected to the transmitting member 18. The power distributing mechanism 16 is placed in the differential state where the first sun gear S1, first carrier CA1 and first ring gear R1 of the first planetary gear unit 24 are placed in a differential state to be rotatable relative to each other to perform a differential action. Thus, the output of the engine 8 is distributed to the first electric motor M1 and the transmitting member 18, and a part of the output distributed to the first electric motor M1 is used to generate and store power thereat or to drive the second electric motor M2.

Accordingly, the differential portion 11 (power distributing mechanism 16) functions as the electrically controlled differential device, for example, in the continuously variable shifting state (electrically controlled CVT state), in which the rotating speed of the transmitting member 18 changes continuously, irrespective of the rotating speed of the engine 8. That is, the differential portion 11 placed in the continuously variable state by the differential state of the power distributing mechanism 16 functions as the electrically controlled continuously variable transmission in which gear ratio γ0 (rotating speed NIN of the driving device input shaft 14/rotating speed N18 of the transmitting member 18) electrically changes from a minimum value γ0 min to a maximum value γ0 max.

The automatic transmission portion 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio ρ2 of about 0.562. The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio ρ3 of about 0.425.

The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio ρ4 of about 0.421.

Assuming the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4 respectively, the above gear ratios ρ2, ρ3 and ρ4 are represented by ZS2/ZR2, ZS3/ZR3, and ZS4/ZR4, respectively.

In the automatic transmission portion 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

Thus, the automatic transmission portion 20 and the differential portion 11 (transmitting member 18) are selectively connected to each other through the first clutch C1 or the second clutch C2 used for establishing the gear shift position in the automatic transmission portion 20. In other words, the first clutch C1 and the second clutch C2 function as the engaging device between the transmitting member 18 and the automatic transmission portion 20. That is, it selectively switches the power transmitting path between the differential portion 11 (transmitting member 18) and the drive wheel 38 in a power transmitting condition allowing the power transmission therethrough, and a power interrupting condition interrupting the power transmission therethrough. That is, engagement of at least one of the first clutch C1 and the second clutch C2 bring the power transmitting path into the power transmitting condition, while release of both the first clutch C1 and the second clutch C2 bring the power transmitting path into the power interrupting condition.

In the automatic transmission portion 20, with release of release side engaging device and engagement of engage side engaging device, the clutch to clutch shifting is executed to selectively establish each of gear stages i.e., gear positions. Thus, gear ratio i.e. shifting ratio γ (=rotational speed N18 of transmitting member 18/rotational speed NOUT of output shaft 22) is obtained for each gear position. For example, for example, as shown in the operation table in FIG. 2, engagement of the first clutch C1 and the third brake B3 establish the first-gear position having the highest gear ratio γ1 of about 3.357, for example, and engagement of the first clutch C1 and the second brake B2 establish the second-gear position having the gear ratio γ2 of about 2.180, for example, which is lower than the gear ratio γ1.

Further, engagement of the first clutch C1 and first brake B1 establish the third-gear position having the gear ratio γ3 of about 1.424, for example, which is lower than the gear ratio γ2, and engagement of the first clutch C1 and second clutch C2 establish the fourth-gear position having the gear ratio γ4 of about 1.000, for example, which is lower than the gear ratio γ3. Engagement of the second clutch C2 and the third brake B3 establish the reverse-gear position having the gear ratio γ4 of about 3.209, for example, which positions between the gear ratios γ1 and γ2. Disengagement or release of the first clutch C1, the second clutch C2, the first brake B1, the second brake B2 and the third brake B3 establish neutral "N" state. Here, the engaging operation of the engaging device of the automatic transmission portion 102 in the fifth gear position is the same as the fourth gear position.

The aforementioned first, and second clutches C1 and C2, and the aforementioned first, second and third brakes B1, B2 and B3 (hereinafter referred to as clutches C and brakes B except when specified otherwise) are engaging elements in a hydraulic friction engaging device that are generally used in conventional vehicle automatic transmissions. The hydraulic friction engaging apparatus can be composed of a wet multi-plate type apparatus, a band brake, or the like. The wet multi-plate type apparatus includes a plurality of friction plates that are aligned with each other, and are thrust by a hydraulic actuator. The band brake includes a rotatable drum that is braked by one or two bands. A hydraulic actuator pulls one end of the band is wound around the outer peripheral surface of the drum to tighten it. The hydraulic frictional engaging device selectively engages members that interpose the hydraulic frictional engaging device with each other.

In the thus-configured transmission mechanism 10, the differential portion 11 that serves as a continuously variable transmission and the automatic shifting portion 20 comprise a continuously variable transmission. By controlling the shifting ratio of the differential portion 11 to be constant, the differential portion 11 and the automatic shifting portion 20 can provide the same structure as a step variable transmission.

Specifically, the differential portion 11 serves as the continuously variable transmission, and the automatic shifting portion 20 that is coupled to the differential portion 11 in series serves as a step variable transmission. Accordingly, rotational speed that is inputted to the automatic shifting portion 20 (hereinafter referred to as "the input rotational speed of the automatic shifting portion 20"), that is, the rotational speed of the transferring member 18 (hereinafter referred to as "transferring member rotational speed N18") continuously varies in at least one speed gear stage of the automatic shifting portion 20. Thus, a continuously variable shifting ratio range can be provided for the speed gear stage. As a result, the overall shifting ratio γT of the transmission mechanism 10 (=(the rotational speed NIN of input shaft 14)/(the rotational speed NOUT of the output shaft 22)) can be continuously provided. Consequently, the transmission mechanism 10 is configured to serve as the continuously variable transmission. The overall shifting ratio γT of the transmission mechanism 10 is the total shifting ratio of the transmission mechanism 10 as a whole, obtained by the shifting ratio γ0 of the differential portion 11 together with the shifting ratio of the automatic shifting portion 20.

For example, the transferring member rotational speed N18 continuously varies for each of the first to fourth speed gear stages and the reverse gear stage of the automatic shifting portion 20 shown in an operation table of FIG. 2. Thus, a continuously variable shifting-ratio width i.e., range can be provided for each of the gear stages. Accordingly, the shifting ratio can continuously vary among the adjacent gear stages. As a result, the continuously variable total shifting ratio γT is provided for the transmission mechanism 10 as a whole.

Alternatively, by controlling the shifting ratio of the differential portion 11 to be constant, and by selectively engaging the clutches C and the brakes B, one of the first to fourth speed gear stages and the reverse gear stage is selected. As a result, the total shifting ratios γT of the transmission mechanism 10 that geometrically vary is provided in each of the gear stages. Consequently, the transmission mechanism 10 can provide the same function as the step variable transmission.

For example, when the differential portion 11 is controlled to have the gear ratio γ0 "1", as shown in the engagement table of FIG. 2, the total gear ratio γT of the shifting mechanism 10 corresponding to each of gear stages of the automatic transmission portion 20 including the first to fourth gear positions and rearward gear position can be obtained. In the fourth gear position of the of the automatic transmission portion 20, when the differential portion 11 is controlled to have the gear ratio γ0 smaller than "1", for example about "0.7", the total gear ratio γT for example about "0.705" which is smaller than the fourth gear position can be obtained shown in the engagement table of FIG. 2.

Figure 3:
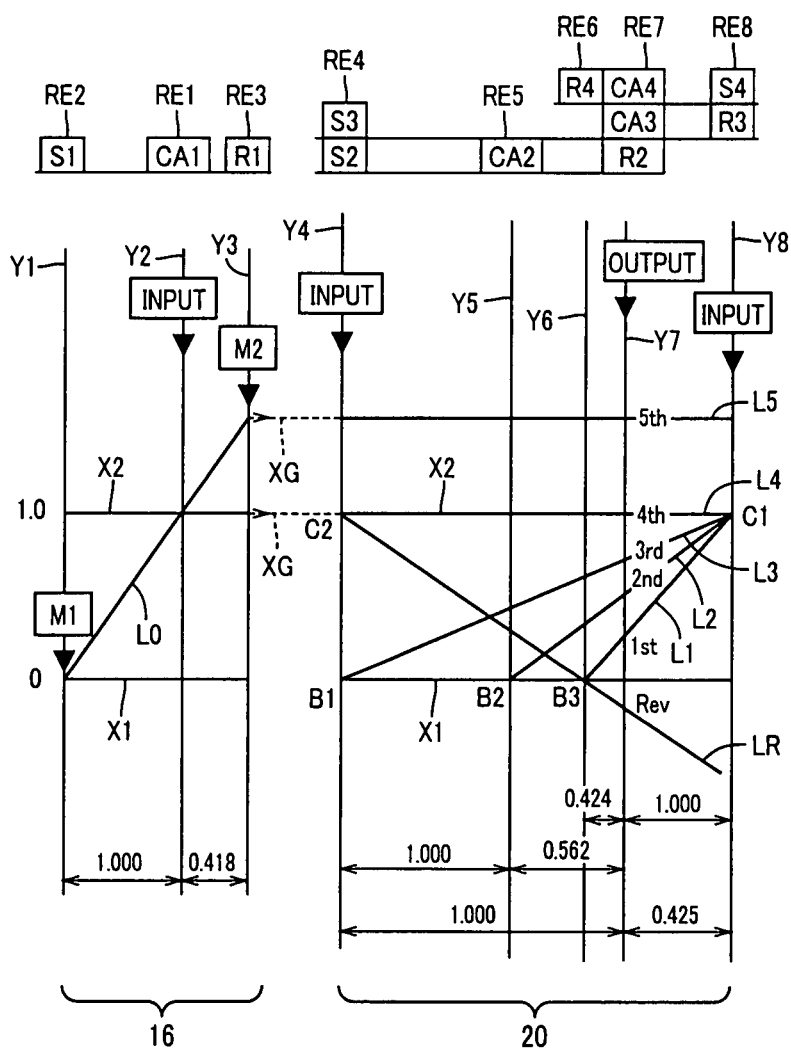
FIG. 3 is a collinear chart explaining the relative rotational speed of each gear stage in the vehicle driving apparatus shown in FIG. 1.

FIG. 3 shows a collinear chart representing by straight lines a relation among the rotating speeds of the rotary elements different in each of the gear positions of the shifting mechanism 10. The shifting mechanism 10 is constituted by the differential portion 11 functioning as the continuously variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear units 24, 26, 28 and 30 are taken along the horizontal axis, while the relative rotating speeds of the rotary elements are taken along the vertical axis. A lower one X1 of three horizontal lines indicates the rotating speed of 0, and an upper one X2 indicates the rotating speed of 1.0, that is, an operating speed $N_E$ of the engine 8 connected to the input shaft 14. The horizontal line XG indicates the rotating speed of the transmitting member 18.

Among three vertical lines Y1, Y2 and Y3 corresponding to the three elements of the differential portion 11, respectively represent from the left the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio ρ1 of the first planetary gear unit 24.

Further, five vertical lines Y4, Y5, Y6, Y7 and Y8 corresponding to the automatic transmission portion 20 respectively represent from the left the relative rotating speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other. The distances between the adjacent pair of the vertical lines Y4 to Y8 are determined by the gear ratios ρ2, ρ3 and ρ4 of the second, third and fourth planetary gear units 26, 28 and 30.

In the relation between the vertical lines of the collinear chart, when distance between the sun gear and the carrier corresponds to "1", distance between the carrier and the ring gear corresponds to "ρ" of the planetary gear unit. That is, in the differential portion 11, distance between the vertical line Y1 and the vertical line Y2 is set to correspond to "1", and distance between the vertical lines Y2 and Y3 is set to correspond to "ρ1". Also, in the automatic transmission portion 20 for the second, third and fourth planetary gear unit 26, 28 and 30, the distance between the sun gear and the carrier is set to correspond to "1", and the distance between the carrier and the ring gear is set to correspond to "ρ".

Representing with the collinear chart of FIG. 3, the shifting mechanism 10 of this embodiment is, in the power distributing mechanism 16 (continuously variable shifting portion 11), arranged such that the first rotary element RE1 (the first carrier CA1), which is one of the three rotary elements of the first planetary gear unit 24, is fixed to the input shaft 14, i.e., the engine. The second rotary element RE2 is fixed to the first electric motor M1. The third rotary element RE3 (the first ring gear R1) as still another rotary element is fixed to the transmitting member 18 and the second electric motor M2. Thus, rotation of the input shaft 14 is transmitted (inputted) to the automatic transmission portion (step-variable transmission portion) 20 through the transmitting member 18. An inclined straight line L0 which passes an intersection point between the lines Y2 and X2 represents a relation between the rotating speeds of the first sun gear S1 and the first ring gear R1.

For example, the case where the shifting mechanism 10 is switched to the differential state, where the first to third rotary elements RE1 to RE3 are mutually rotatable. Rotation of the sun gear S1 represented by the intersection point between the straight line L0 and the vertical line Y1 increases or decreases by control of the rotation speed of the first electric motor M1. When the rotation speed of the ring gear R1 determined depending on the vehicle speed V is substantially constant, the rotation speed of the first carrier CA1 represented by the intersection point between the straight line L0 and the vertical line Y2 i.e., the engine rotation speed $N_E$ increases or decreases.

By controlling the rotational speed of the first electric motor M1 such that the gear ratio γ0 of the differential portion 11 is fixed at "1", the rotational speed of the first sun gear S1 is set to have the same rotational speed of the engine rotational speed. Thus, the straight line L0 is coincided with the lateral line X2, so that the first rig gear R1 i.e., the transmitting member 18 rotates in the same rotational speed of the engine rotational speed. Alternately, by controlling the rotational speed of the first electric motor M1 such that the gear ratio γ of the differential portion 11 is fixed at zero, the straight line L0 is set in a state shown in FIG. 3, the transmitting member 18 rotates in the rotational speed N18 which is increased compared with the engine rotational speed.

In the automatic transmission portion 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the output shaft 22, and the eighth rotary element RE8 is selectively connected to the transmitting member 18 through the first clutch C1.

As shown in FIG. 3, in the automatic transmission portion 20, upon engagement of the first clutch C1 and the third brake B3, the rotating speed of the output shaft 22 in the first-speed position is represented by an intersection point between the inclined linear line L1 and the vertical line Y7. Here, the inclined straight line L1 passes an intersection point between the vertical line Y8 indicative of the rotating speed of the eighth rotary element RE8 and the horizontal line X2, and an intersection point between the vertical line Y6 indicative of the rotating speed of the sixth rotary element RE6 and the horizontal line X1.

Similarly, the rotating speed of the output shaft 22 in the second-speed position is represented by an intersection point between an inclined straight line L2 determined by engagement of the first clutch C1 and second brake B2, and the vertical line Y7 indicative of the rotating speed of the seventh rotary element RE7 fixed to the output shaft 22. The rotating speed of the output shaft 22 in the third-speed position is represented by an intersection point between an inclined straight line L3 determined by engagement of the first clutch C1 and first brake B1, and the vertical line Y7 indicative of the rotating speed of the seventh rotary element RE7 fixed to the output shaft 22. The rotating speed of the output shaft 22 in the fourth-speed position is represented by an intersection point between a horizontal line L4 determined by engagement of the first clutch C1 and second clutch C2, and the vertical line Y7 indicative of the rotating speed of the seventh rotary element RE7 fixed to the output shaft 22.

When power from the differential portion 11 is inputted to the eighth rotary element RE8 with a speed higher than the engine speed, if the straight line L0 is set in the state as shown in FIG. 3 in the differential portion 11, the rotating speed of the output shaft 22 in the fifth-speed position is represented by an intersection point between a horizontal line L5 and the vertical line Y7. Here, the horizontal line L5 is determined by engagement of the first clutch C1, and second clutch C2, and the vertical line Y7 indicates the rotating speed of the seventh rotary element RE7 fixed to the output shaft 22.

Figure 4:
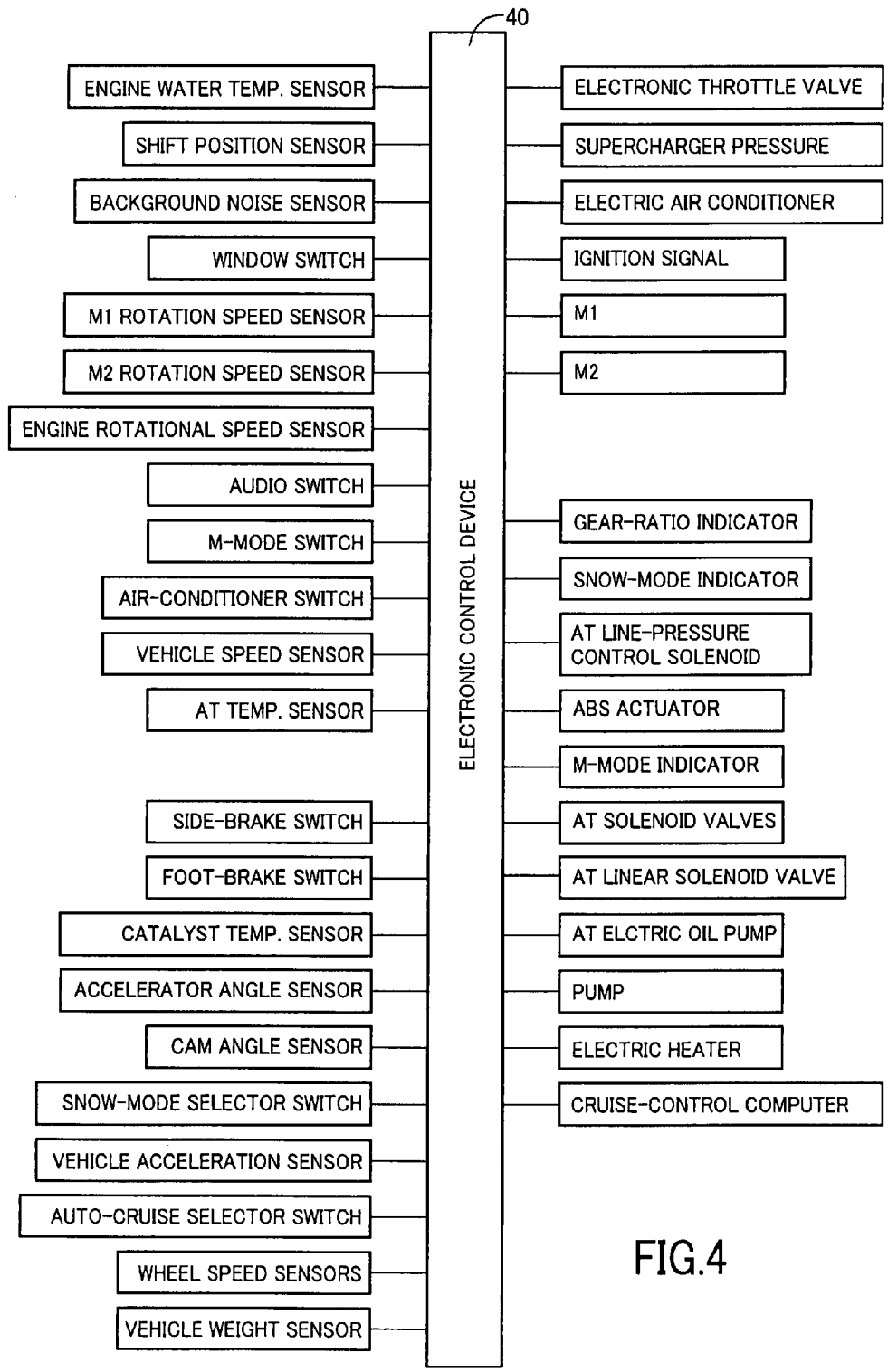
FIG. 4 is a diagram explaining input and output signals of an electronic control device that is installed in the driving apparatus shown in FIG. 1.

FIG. 4 illustrates signals input to an electronic control device 40 and signals output therefrom to control the shifting mechanism 10. This electronic control device 40 includes a so-called microcomputer incorporating a CPU, a ROM, a RAM and an input/output interface. By performing signal processing according to programs stored in the ROM utilizing a temporary data storage function of the ROM, the electronic control device 40 implements hybrid drive controls of the engine 8 and electric motors M1 and M2, and drive controls such as shifting controls of the automatic transmission portion 20.

To the electronic control device 40, from various sensors and switches shown in FIG. 4, various signals are inputted, which include a signal indicative of a temperature of cooling water of the engine, a signal indicative of a selected operating position of a shift lever, signal indicative of back ground noise, signal indicative window switch, a signal indicative of the rotational speed of the first electric motor M1, a signal indicative of the rotating speed of the second electric motor M2, a signal indicative of the rotational speed of the engine, a signal indicative of audio installed on the vehicle, a signal indicative of a command for M mode (motor drive mode), a signal indicative of an operated state of an air conditioner, a signal indicative of a vehicle speed corresponding to the rotating speed of the output shaft 22, a signal indicative of a working oil temperature of the automatic transmission portion 20, a signal indicative of an operated state of a side brake, a signal indicative of an operated state of a foot brake, a signal indicative of a catalyst temperature, a signal indicative of an opened amount of an accelerator pedal, a signal indicative of a cam angle, a signal indicative of a snow drive mode, a signal indicative of a longitudinal acceleration value of the vehicle, and a signal indicative of an auto-cruising drive mode, a signal indicative of turbine rotational speed, and a signal indicative of vehicle weight.

From the electronic control device 40, various control signals are outputted which includes a signal to drive a throttle actuator for controlling an opening degree of a throttle valve, a signal to adjust a supercharger pressure, a signal to operate the electric air conditioner, a signal for controlling an ignition timing of the engine, signals to operate the electric motors M1 and M2, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode, a signal to operate solenoid-operated valves incorporated in a hydraulic control unit (not shown) provided to control the hydraulic actuators of the hydraulically operated frictional engaging devices of the power distributing portion 16 and the automatic transmission portion 20, a signal to operate an electric oil pump used as a hydraulic pressure source for the hydraulic control unit, a signal to drive an electric heater, and a signal to be applied to a cruise-control.

Figure 5:
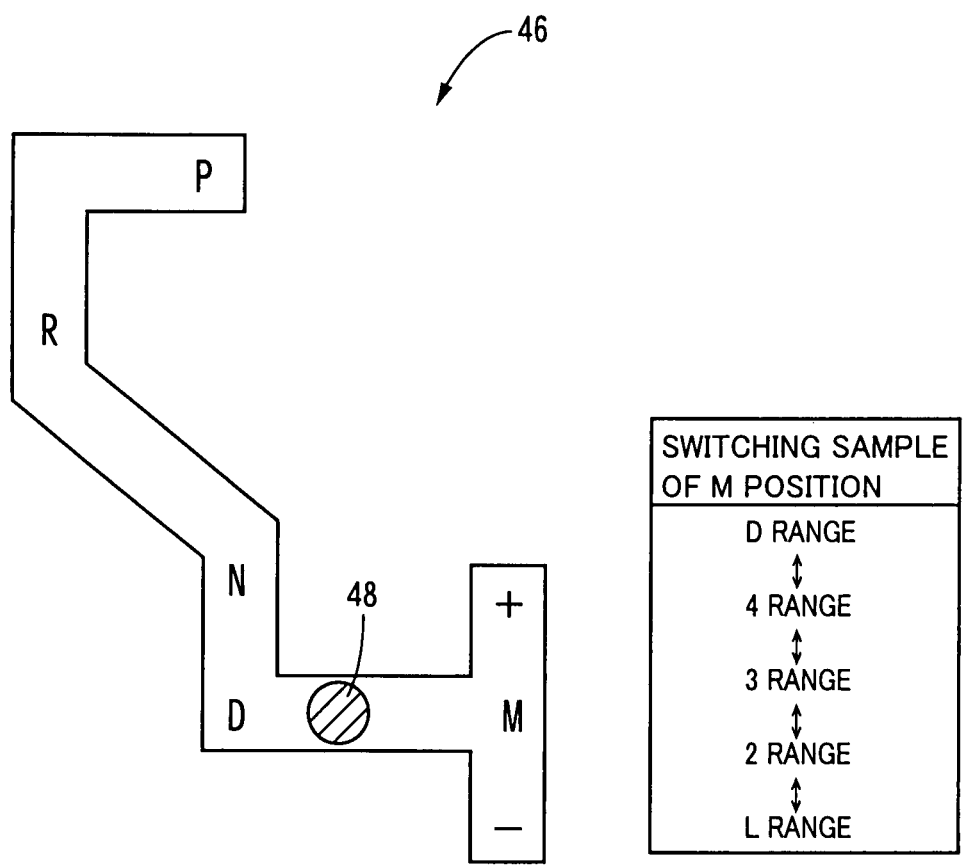
FIG. 5 is a view showing an exemplary manual shifting operation device as a shifting operation device.

FIG. 5 shows on example of a switch device 46 to be switched by manual operation to one of plural kinds of shift positions. This switch device 46 includes a shift lever 48 disposed for example at lateral side of the driver's seat and manually operated to select one of plural kinds of shifting positions. This switch device 46 is selectively shifted to one of a parking position "P (parking)", rearward running position "R (reverse)" for rearward running, neutral position "N (neutral)", forward automatically shifted running drive position "D (drive)", and forward manually shifted running drive position "M (manual)". In the "P (parking)", none of the engaging device such as the first clutch C1 and the second clutch C2 are not engaged as shown in the operation table of FIG. 2, to set the interrupt state of the power transmitting path in the shifting mechanism 10 i.e., the automatic transmission portion 20, and to lock rotation of the output shaft 22. In the "N (neutral)", the power transmitting path in the shifting mechanism 10 is interrupted.

Among the respective shifting positions "P" to "M," at each of the non-running positions such as "P" and "N," for example, both the first clutch C1 and the second clutch C2 are released. These are non-drive positions for selecting a state in which the power transmitting path in the automatic transmission portion 20 is cut off to disable the vehicle drive. Also, at each of the running positions "R", "D" and "M" for example, at least one of the first clutch C1 and the second clutch C2 is engaged. These are drive positions for selecting a state in which the power transmitting path in the automatic transmission portion 20 is connected to enable the vehicle drive. Also, the "D" position is the running position at the maximum speed, and the "4" range to "L" range in the "M" position are engine brake ranges for obtaining an engine brake effect.

The "M" position is located at the same position as the "D" position in the longitudinal direction of the vehicle, and is adjacent thereto in the lateral direction of the same. The shift lever 48 is operated to the "M" position, for manually selecting one of the above-indicated "D" through "L" positions. Described in detail, at the "M" position, a shift-up position "+" and a shift-down position "−" spaced from each other in the longitudinal direction of the vehicle are disposed. Each movement of the shift lever 48 to the shift-up position "+" or the shift-down position "−", any one of "D" to "L" positions is selected.

For example, the five shifting ranges including the "D" range to the "L" range to be selected in the "M" position are plural kinds of shifting ranges of which total gear ratio at the high speed side (small side of the gear ratio) are different from each other, in the changeable range of the total gear ratio γT enabling the automatic shifting control of the shifting mechanism 10. Also, they limit the changeable range of the shifting positions (gear positions) so that the maximum shifting positions where the automatic shifting portion 20 is shifted are different.

The shift lever 48 is urged by urging means such as a spring and the like to be automatically returned from its up-shift position "+" and the down-shift position "−" to its "M" position. Also, the switch device 46 is provided with a shift position sensor 49 for detecting each of the shift positions of the shift lever 48, to output a signal representing a shift position PSH and the number of operations at the "M" position to the electronic control device 40.

Figure 6:
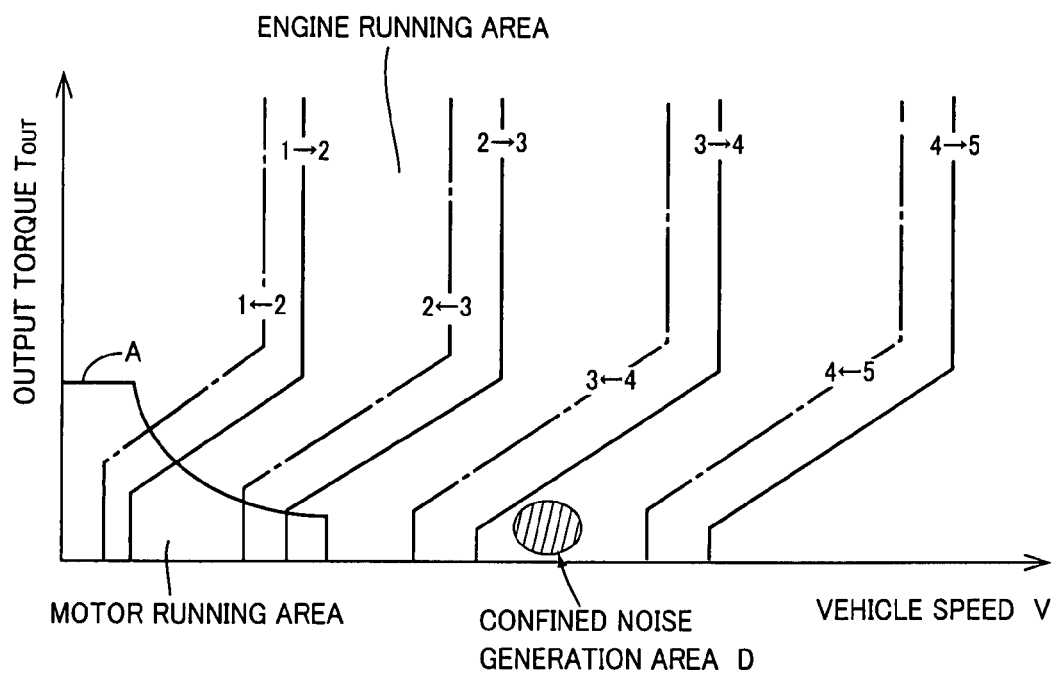
FIG. 6 is a view showing an exemplary shifting diagram that is used for shifting control of an automatic shifting portion of the vehicle driving apparatus.

FIG. 6 represents the shifting diagram for determining whether the automatic transmission portion 20 execute the shifting or not, that is the shifting position in the automatic transmission portion 20. This shifting diagram is a two-dimensional coordinate showing the vehicle condition with parameters in terms of the vehicle speed V and the required output torque $T_{OUT}$. In FIG. 6, a solid line represents an up-shift line and a single dot line represents a downshift line are preliminary memorized to be used in the determination. Based on the determination, the automatic transmission portion 20 is controlled such that determined shifting position is obtained.

In FIG. 6, a shaded area D shows a confined noise generation area. If a vehicle runs in conditions of vehicle speed V and output torque TOUT that correspond to the confined noise generation area, confined noise is likely to be generated. The confined noise generation area D corresponds to the vehicle running state where that generation of confined noise is confirmed if confined noise control measures are not taken by an experiment or a simulation.

Figure 7:
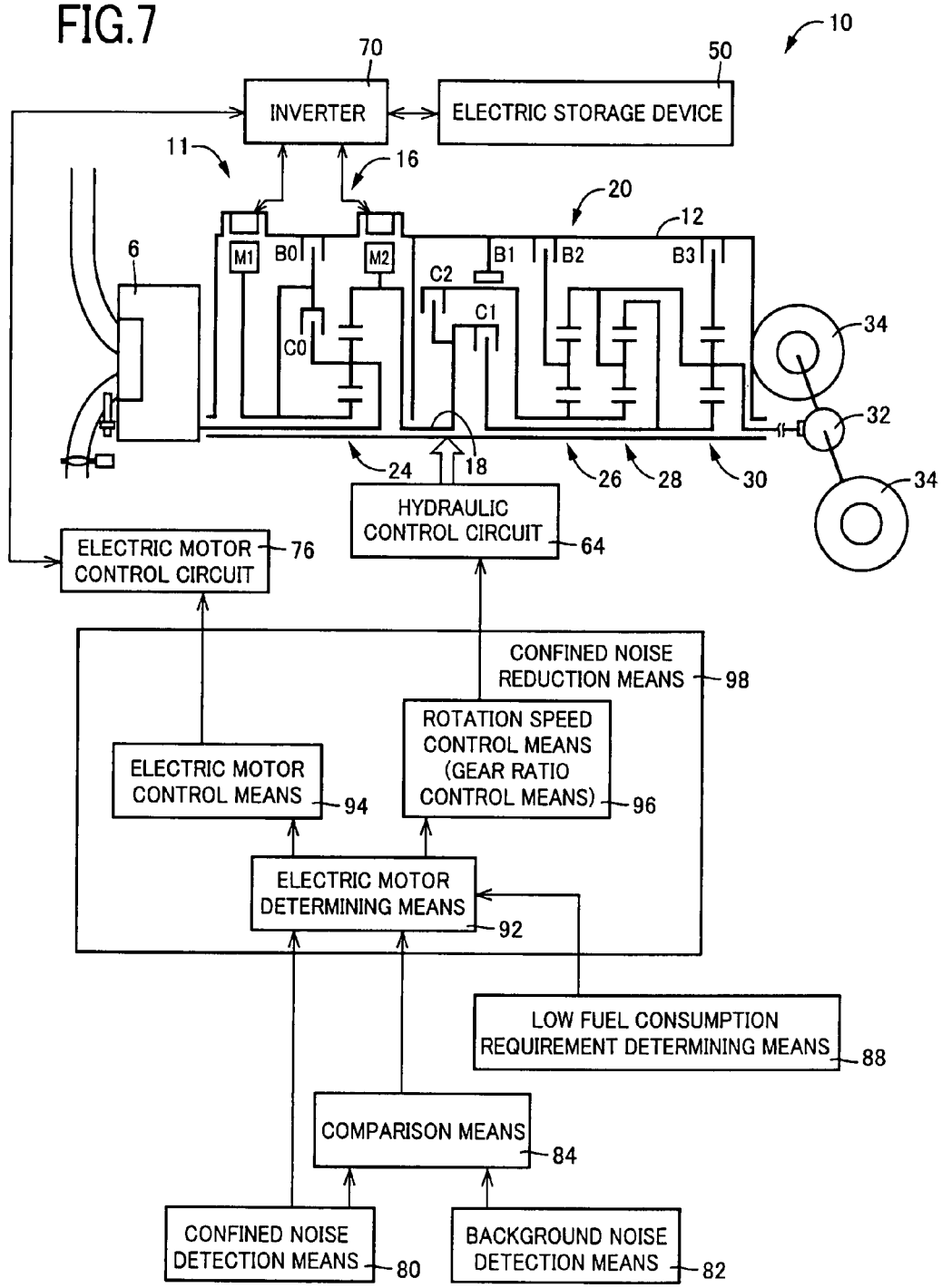
FIG. 7 is a functional block diagram explaining the main parts of a control function of the electronic control device shown in FIG. 4.

FIG. 7 is a functional block diagram explaining a control operation of the electronic control device (control device) 40 which forms a principal part of the present invention, in other words, control operation that controls the electric motor when confined noise is detected. The control device 40 includes a confined noise detection means 80, a background noise detection means 82, a comparison means 84, a low fuel consumption requirement determining means 88, a confined noise reduction means 98, and the like.

The confined noise detection means 80 detects generation of confined noise based on whether the vehicle speed V and the output torque TE of the vehicle in the vehicle operating state fall within the confined noise generation area D shown in the shifting diagram of FIG. 6, for example. The levels of confined noise that are generated in the confined noise generation area D are previously obtained by an experiment or a simulation of vehicle running states, in other words, of different combinations of vehicle speed V and output torque TE. The obtained levels of confined noise are stored in a map in which the vehicle speed V and the output torque TE are set as horizontal and vertical lines. Accordingly, generation of confined noise is detected, and the level LK (dB) of the confined noise can also be detected.

The background noise detection means 82 detects the level LA (dB) of background noise that is noise in the vehicle other than the confined noise to be controlled by the invention, by a microphone that is installed in the vehicle, for example.

The comparison means 84, comparing the level LK of the confined noise detected by the confined noise detection means 80 with the level LA of the background noise detected by the background noise detection means 82, determines whether confined noise reduction control is necessary. Specifically, when the level LA of the background noise is such that the confined noise in the vehicle will be lost in i.e., drowned out the background noise, the level LA of the background noise is determined to be high compared with the level LK of the confined noise. In this case, the confined noise is determined to be unobtrusive. The state where the confined noise is drown out by the background noise corresponds to a relation shown in FIG. 9 where the level LA1 of background noise has a relationship with the level LK of confined noise A. In this state, the background noise makes the confined noise unobtrusive.

Figure 9:
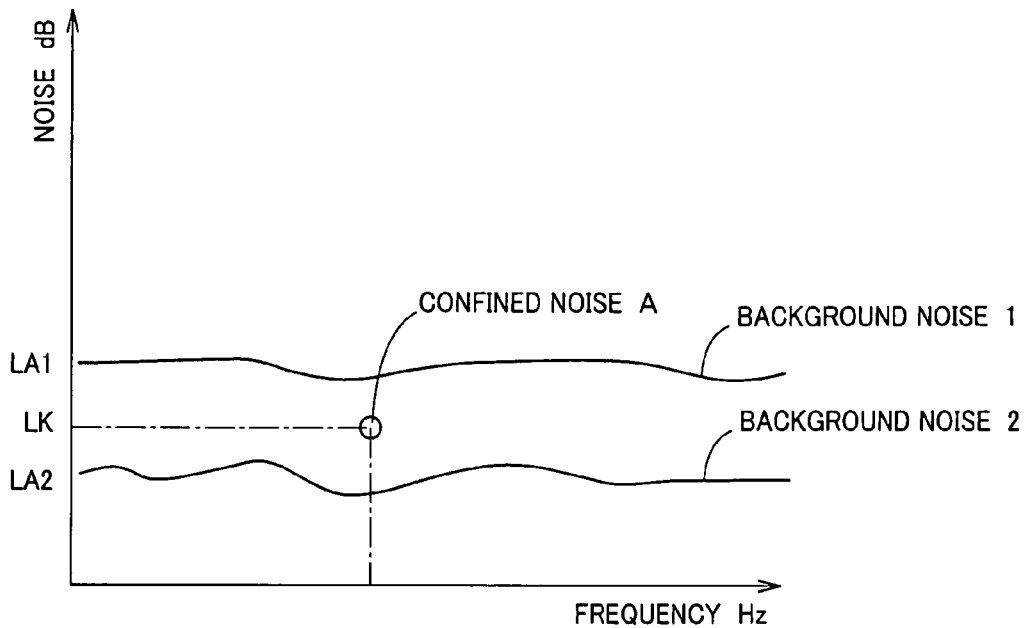
FIG. 9 is a graph showing the relationship between the level of background noise and the level of confined noise.

Conversely, where the confined noise is not lost in the background noise as in the case that is represented by background noise 2 in FIG. 9, the level LA2 of the background noise is not high compared with the level LK of the confined noise. In this case, the confined noise is determined to be obtrusive.

Returning to FIG. 7 again, the low fuel consumption requirement determining means 88 determines whether a driver intends a low fuel consumption requirement to run i.e., drive the vehicle in low fuel consumption mode. For example, this determination is made based on a signal outputted from a low fuel consumption requirement switch (not shown) that is operated by the driver intending to achieve low fuel consumption requirement. When the confined noise reduction means 98 executes confined noise reduction control as discussed later, fuel efficiency may be worsened. For this reason, if the driver does not intend confined noise reduction that may worsens fuel efficiency, and intends the low fuel consumption requirement, confined noise reduction control is not executed. Note that the low fuel consumption requirement determining means 88 is used in a third embodiment to be discussed later, but not used in this first embodiment.

The confined noise reduction means 98 principally includes an electric motor determining means 92, an electric motor control means 94, and a rotational speed control means 96. For example, there is a case where the comparison means 84 determines that the confined noise is not lost in the background noise, that is, the level LA of the background noise is not high compared with level LK of the confined noise, to make the confined noise obtrusive. In this case, the confined noise reduction means 98 executes an operation that reduces the confined noise generated by variation of the torque outputted from the engine 6.

The electric motor determining means 92, detecting the state of the electric power storage device 50 installed in the vehicle, e.g., the charge state (SOC or state of charge), determines whether the detected electric power storage amount SOC is higher than a predetermined value E. The predetermined value E is previously and experimentally defined as the charge amount of the electric power storage device 50 that provides sufficient electric power for electric motor control by the electric motor control means 94 to be discussed later. If SOC is higher than the predetermined value E, in other word, if the electric power storage device 50 can provide electric power for electric motor control, control by the electric motor control means 94 to be discussed later is executed.

The electric motor control means 94 controls i.e., allows the second electric motor M2 to output torque that varies in opposite phase to the variation of the torque, which is outputted from the engine 6 and which causes the confined noise. Specifically, the input torque TIN of the input shaft 14 is measured, and the time variation of the input torque TIN that causes the confined noise is calculated. In addition to this, variation of torque in opposite phase to the variation of the input torque TIN is calculated. The second electric motor M2 is operated to output the calculated variation of torque in opposite phase to the variation of the input torque TIN. The variation of torque outputted provided from the engine 6 and the variation of torque outputted provided from the second electric motor M2 have phases opposed to be cancelled to each other. Thus, the variation of torque that causes the confined noise is reduced or suppressed.

The rotational speed control means 96 adjusts the driving state of the engine 6, that is, a combination of the rotational speed NE and the output torque TE, into a non-confined noise generating operation area in which the confined noise is not generated but the engine can be driven. Specifically, the rotational speed control means 96 adjusts the gear stage of the automatic shifting portion 20 as the step variable transmission in the transmission mechanism 10 to provide the vehicle running state which does not generate the confined noise. That is, the rotational speed control means 96 adjusts a combination of the vehicle speed V and the output torque TE as the driving state of the vehicle, so as to be shifted outside the confined noise generation area D shown as a shaded area in FIG. 6.

Figure 10:
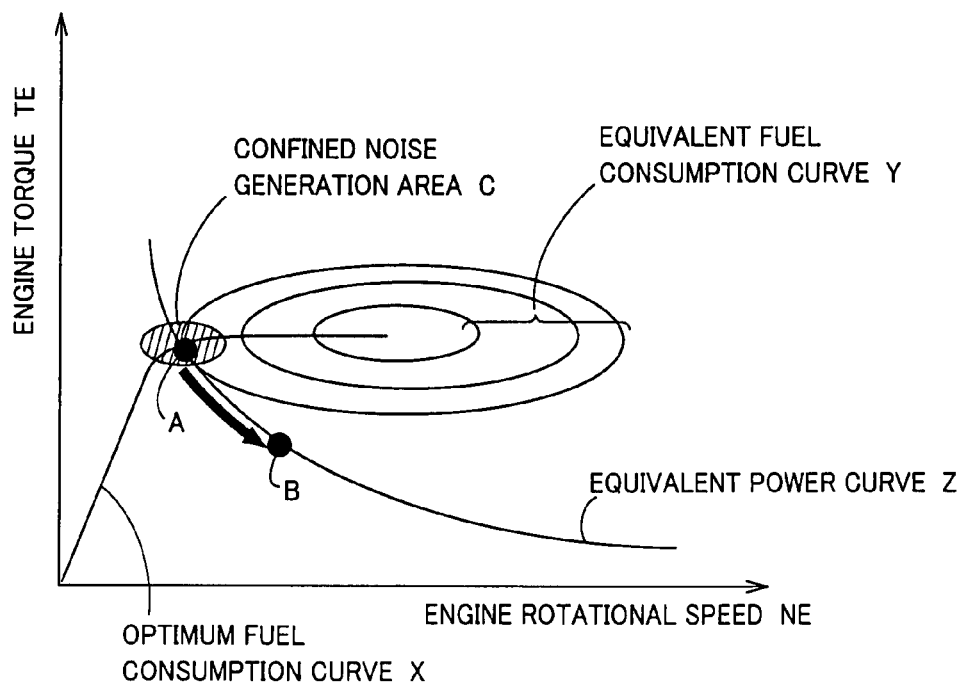
FIG. 10 is a graph showing the state where an operating point that represents engine rotational speed and output torque is adjusted.

FIG. 10 is a graph showing an example of the state in which the rotational speed control means 96 adjusts the operating state of the engine 6. The horizontal axis of the graph indicates the engine rotational speed NE, and the vertical axis of the graph indicates the engine torque TE. The operating state is represented as the plane that is defined by the horizontal and vertical axes. The shaded area C is the operating area which generates the confined noise. If the operating state of the engine 6 is represented by a point A located in the confined noise generation area C, the operating state of the engine 6 is adjusted to an operating state corresponding to a point B that lies on an equivalent power curve Z that passes through the point A, but is spaced away by a predetermined amount from the rim of the confined noise generation area C.

Figure 8:
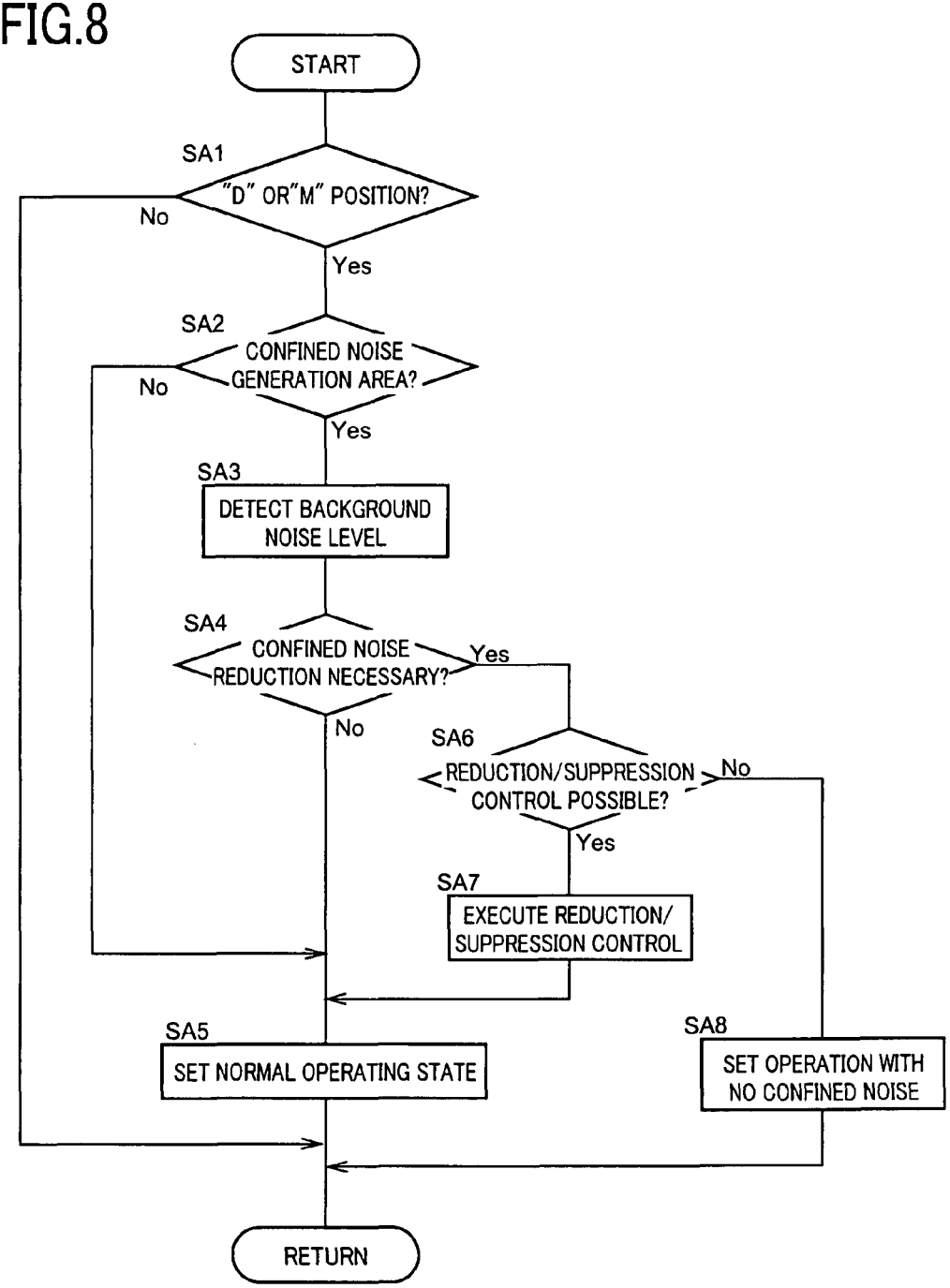
FIG. 8 is a flowchart explaining a control operation of the electronic control device.

FIG. 8 is a flow chart explaining the principal part of the control operation of the electronic control device 40, that is, control operation by the confined noise reduction means 98 that reduces the confined noise in the vehicle. For example, this sequence may be repeatedly executed in a very short cycle time period of approximately several milliseconds to several tens of milliseconds.

In Step SA1, it is first determined whether the position PSH of the shift lever 48 is at a forward gear position, i.e., the D or M position. If YES is the determination of Step SA1, in other words, if the shift position PSH is the D or the M position, Step SA2 is then executed. If NO is the determination of Step SA1, in other words, if the shift position PSH is a position other than the D and M positions, which means the vehicle is not in the forward vehicle operating state, one cycle of the flowchart ends because control according to the present invention is not required.

Subsequently, in Step SA2 corresponding to the confined noise detection means 80, whether the confined noise is being generated in the current operating state of the engine 6 is determined. For example, this determination may be made based on whether the point representing a combination of the vehicle speed V and the output torque TE, or a combination of the engine rotational speed NE and the engine power torque TE, falls within the shaded confined noise generation area D or C in FIG. 6 or 10.

The levels of confined noise that are generated in the confined noise generation area D or C can be previously calculated based on an experiment or a simulation of vehicle operating states, and can be stored in a map. The level LK of confined noise corresponding to an actual operating state is read for detection. If YES is the determination in Step SA2, the confined noise is likely to be generated, and Step SA3 is then executed. If NO is the determination of Step SA2, the confined noise is less likely to be generated, and Step SA5 is then executed.

In Step SA3 corresponding to the background noise detection means 82, the level LA of background noise is detected by a microphone that is installed in the vehicle, for example. The background noise is noise in the vehicle other than the confined noise.

In Step SA4 corresponding to the comparison means 84, the level LK of the confined noise detected in Step SA2 is compared with the level LA of background noise detected in Step SA3, to determine whether confined noise reduction control is necessary. Specifically, the level of the confined noise in the vehicle is lower than the level LA1 of background noise, that is, the confined noise in the vehicle may be lost in the background noise 1 shown in FIG. 9. In this case, since the level LA1 of background noise is high compared with the level LK of the confined noise, the confined noise being unobtrusive is determined, and NO is determined in Step SA4.

Conversely, when the confined noise is not lost in the background noise as in the case represented by the background noise 2 shown in FIG. 9, the level LA2 of background noise is not high compared with the level LK of the confined noise. In this case, the confined noise being obtrusive is determined, and YES is determined in Step SA4. If YES is the determination of Step SA4, Step SA6 is executed. If NO is the determination of Step SA4, Step SA5 is executed.

In Step SA6 corresponding to the electric motor determining means 92, the state of the electric power storage device 50 installed in the vehicle, i.e., the charge state (SOC or state of charge) is detected. It is determined whether the detected state of the electric power storage device 50 allows electric motor control by the electric motor control means 94 to be discussed later. If YES is the determination of Step SA6, in other words, if the state of the electric power storage device 50 allows the electric motor control, Step SA7 is executed. Conversely, if it is difficult for the state of the electric power storage device 50 to allow the electric motor control, Step SA8 is executed.

In Step SA7 corresponding to the electric motor control means 94, the second electric motor M2 is controlled to output torque varying in opposite phase to the variation of the torque which is outputting from the engine 6 and which causes a confined noise. Specifically, the input torque TIN of the input shaft 14 is measured, and the time variation of the input torque TIN that causes the confined noise is calculated. In addition to this, the variation of torque in opposite phase to the variation of the input torque TIN is calculated. The second electric motor M2 is operated to provide the calculated torque variation of opposite phase.

In Step SA8 corresponding to the rotational speed control means 96, the operating state of the engine 6, that is, the combination of the rotational speed NE and the output torque TE, is adjusted into a non-confined noise generating operation area not generating the confined noise, of the area in which the engine 6 can operate. Specifically, the gear stage of the automatic shifting portion 20 in the transmission mechanism 10 is adjusted to provide a vehicle operating state which does not generate the confined noise. That is, the combination of the vehicle speed V and the output torque TE is adjusted so as to be shifted to outside the confined noise generation area D that is shown as a shaded area in FIG. 6.

In Step SA5, the combination of the rotational speed E and the output torque TE of the engine 6 is set to a normal operating state within the operating area of the engine 6. The normal operating state can be a point that lies on the optimal fuel efficiency curve X shown in FIG. 10 in view of the most efficient use of fuel, for example.

Figure 11:
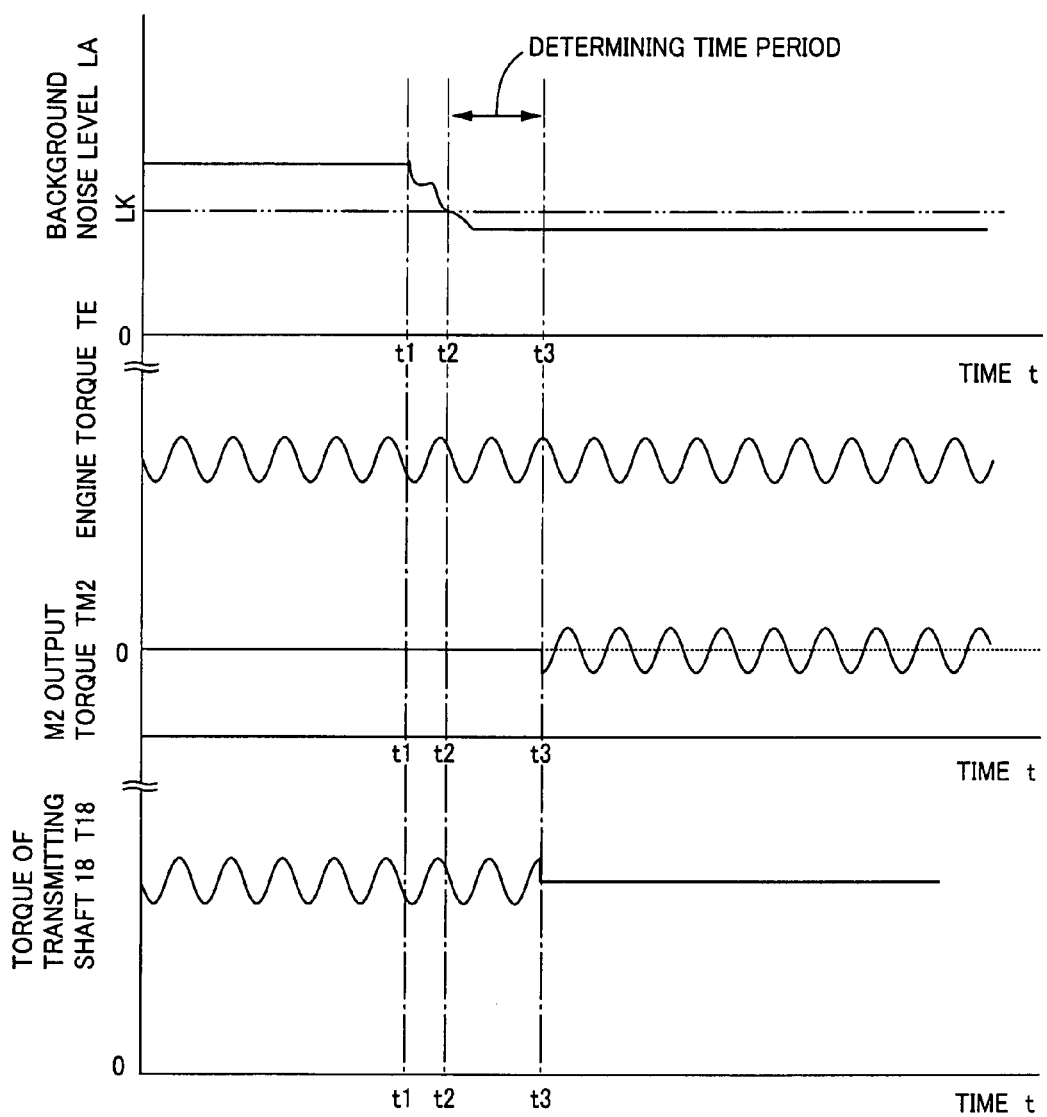
FIG. 11 is a timing chart showing the state where electric motor control means, of confined noise reduction means, executes control to reduce confined noise.

FIG. 11 is a timing chart showing the state in which confined noise reduction control according to this embodiment, in particular, by the electric motor control means is executed. At time t1, the confined noise detection means 80 (Step SA2) detects the generation and the level LK of the confined noise. The background noise detection means 82 (Step SA3) starts operating at time t2, to detect the level LA of background noise from time t2 to time t3. At time t3, the comparison means 84 (Step SA4) determines that the level LA of the background noise is lower than the level LK of the confined noise shown by a chain double-dashed line in FIG. 11, which means that the confined noise is accordingly not lost in the background noise. In this case, the confined noise reduction means 98 executes confined noise reduction.

In the confined noise reduction means 98, with determination by the electric motor determining means 92 (Step SA6) the charge amount SOC of the electric power storage device 50 being higher than the predetermined value, the electric motor control means 94 (Step SA7) controls the second electric motor M2 to output torque TM2 of torque variation in opposite phase to the torque variation of the engine torque TE. The engine torque TE and the output torque TM2 of the second electric motor are superposed in the differential portion 11. As a result, in the torque T18 of the transferring member 18 functioning the output shaft of the differential portion 11, the torque variation is eliminated from the engine torque TE.

Figure 12:
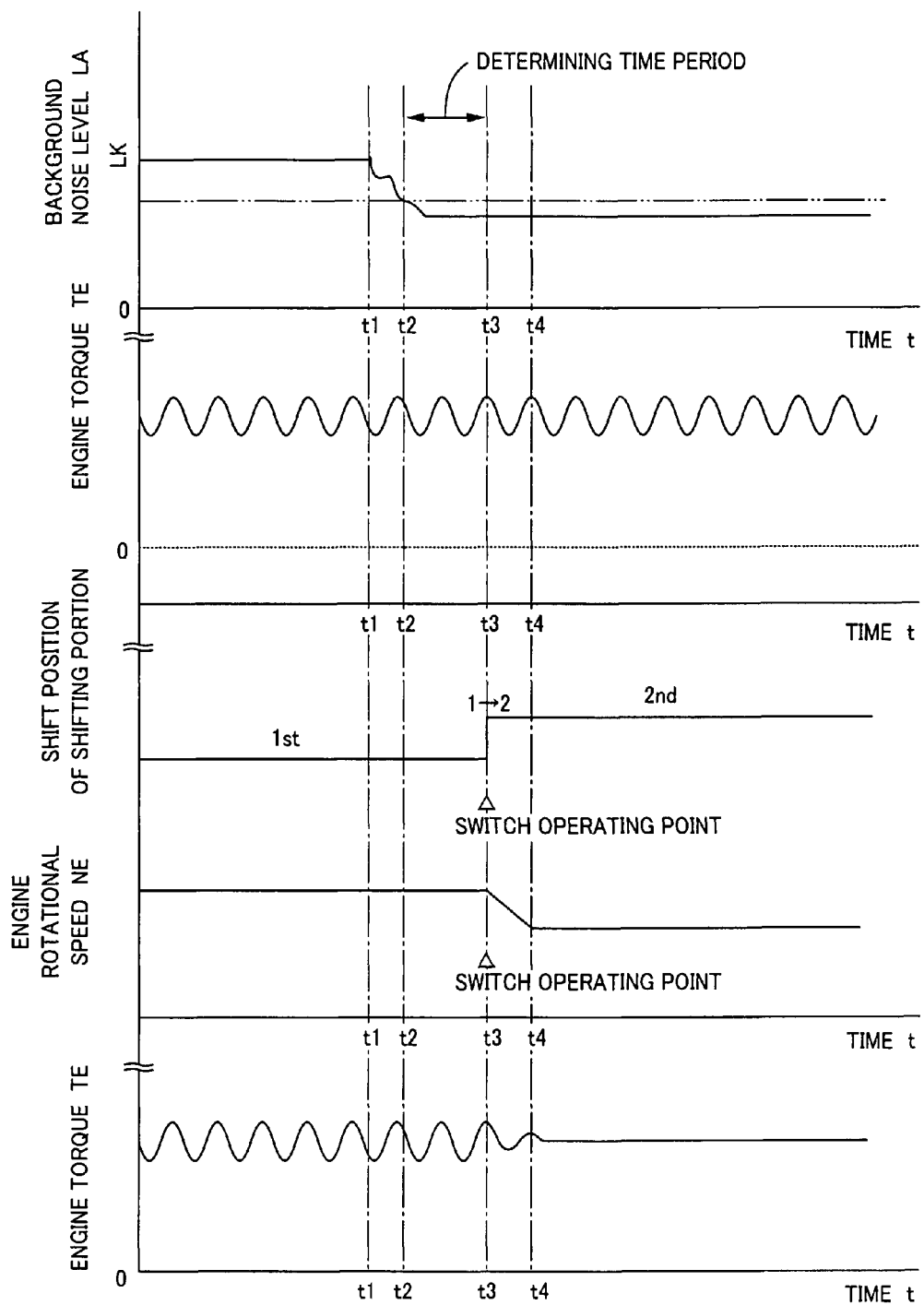
FIG. 12 is a timing chart showing the state where rotational speed control means, of confined noise reduction means, executes control to reduce confined noise.

FIG. 12 is a timing chart showing the state where confined noise reduction control according to this embodiment, in particular, by the rotational speed control means 96 is executed, and the charge amount SOC of the electric power storage device 50 is lower than the predetermined value is determined. Similar to the case shown in FIG. 11, at time t1, the confined noise detection means 80 (Step SA2) detects the generation and the level LK of the confined noise. The background noise detection means 82 (Step SA3) starts operating at time t2, to detect the level LA of background noise from time t2 to time t3. At time t3, the comparison means 84 (Step SA4) determines that the level LA of the background noise is lower than the level LK of the confined noise shown by a chain double-dashed line in FIG. 11, which means that the confined noise is accordingly not lost in the background noise. In this case, the confined noise reduction means 98 executes confined noise reduction. In the confined noise reduction means 98, with determination by the electric motor determining means 92 (Step SA6) the charge amount SOC of the electric power storage device 50 being lower than the predetermined value As a result, due to control impossibility of the second electric motor M2 by the electric motor control means 94 (Step SA7), the rotational speed control means 96 (Step SA8) executes control. The rotational speed control means 96 provides instruction to shift the gear stage of the automatic shifting portion 20 as the step variable transmission from the first speed gear stage as the current speed gear stage to the second speed gear stage, for example. Thus, the speed gear stage of the vehicle is shifted from time t3 to time t4, wherein the rotational speed NE of the engine 6 gradually decreases until the speed gear stage is completely shifted at time t4. Consequently, the combination of the output torque TE and the engine rotational speed NE shifted from the confined noise generation area C shown in FIG. 10, thereby stopping generation of the confined noise.

Other embodiments according to the present invention are now described. In the following description, components common to the embodiments are given the same reference numerals, and their description is omitted.

Embodiment 2

Figures 13, 14:
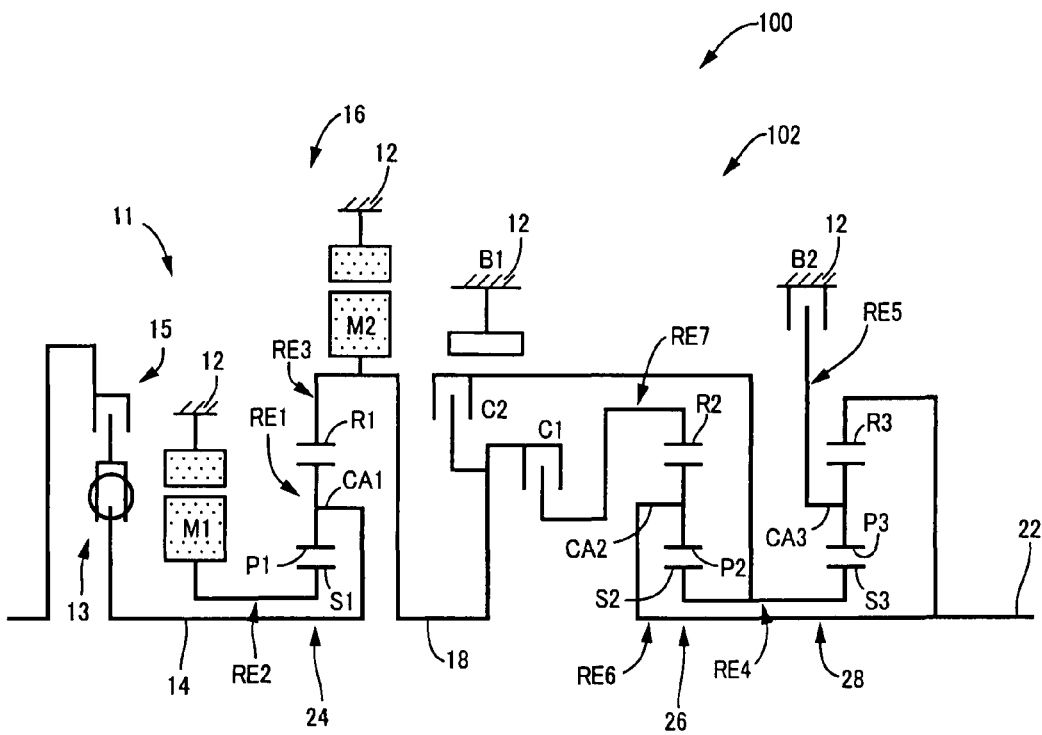
FIG. 13 is a view schematically illustrating the configuration of a hybrid vehicle driving apparatus according to another embodiment of the present invention, and corresponding to FIG. 1.
FIG. 14 is an operation table showing the operational combinations of a hydraulic friction engaging device that is used for a shifting operation of the vehicle driving apparatus shown in FIG. 11, and corresponding to FIG. 2.

A second embodiment is now described with reference mainly to FIGS. 13 to 15. FIG. 13 is a view schematically illustrating the configuration of a transmission mechanism 100 that forms a part of a vehicle driving apparatus 99 according to another embodiment of the present invention. FIG. 14 is an engagement table showing operational combinations of a hydraulic frictional engaging device used for the shifting operation of the transmission mechanism 100.

Figure 15:
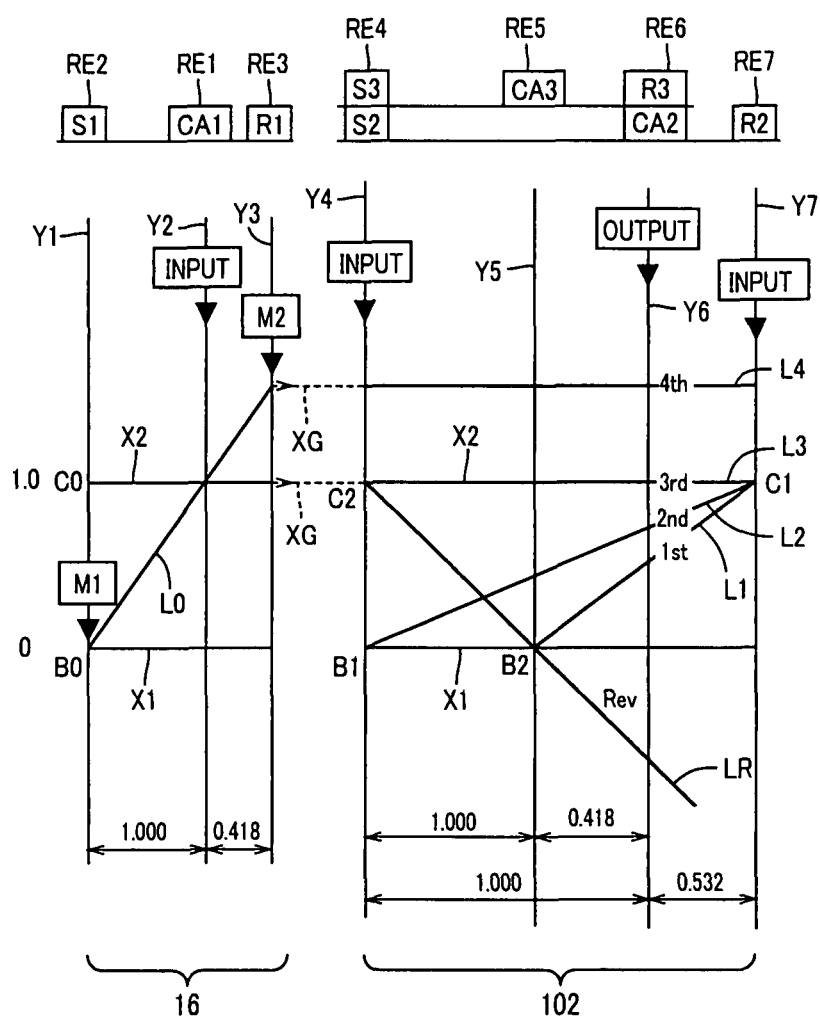
FIG. 15 is a collinear chart explaining the relative rotational speed of each gear stage in the vehicle driving apparatus shown in FIG. 11, and corresponding to FIG. 3.

FIG. 15 is a collinear chart explaining the shifting operation of the transmission mechanism 100. FIGS. 4 to 12 in the first embodiment can be referred for this embodiment.

Like the illustrated embodiment described above, the shifting mechanism 100 comprises the differential portion 11 including the first electric motor M1, the power distributing mechanism 16 and the second electric motor M2, and an automatic transmission portion 102 with three forward-gear positions connected to the differential portion 11 and the output shaft 22 in series via the transmitting member 18. The power distributing mechanism 16 includes the first planetary gear unit 24 of the single pinion type having a given gear ratio ρ1 of, for instance. The automatic transmission portion 102 includes the second planetary gear unit 26 of the single pinion type having a given gear ratio ρ2 of, for instance, about 0.532, and the third planetary gear unit 28 of the single pinion type having a given gear ratio ρ3 of, for instance, about 0.418.

The sun gear S2 of the second planetary gear unit 26 and the sun gear S3 of the third planetary gear unit 28 are integrally connected to each other. These gears S2 and S3 are selectively coupled to the transmitting member 18 via the second clutch C2 and also selectively coupled to the case 12 via the first brake B1. The second carrier CA2 of the second planetary gear unit 26 and the third ring gear R3 of the third planetary gear unit 28 integrally connected to each other are connected to the output shaft 22. The second ring gear R2 is selectively connected to the transmitting member 18 via the first clutch C1 and the third carrier CA3 is selectively coupled to the case 12 via the second brake B2.

Thus, the automatic transmission portion 102 and the differential portion 11 (transmitting member 18) are selectively connected to each other through the first clutch C1 or the second clutch C2 used for establishing the gear shift position in the automatic transmission portion 102. In other words, the first clutch C1 and the second clutch C2 function as the engaging device between the transmitting member 18 and the automatic transmission portion 102. That is, it selectively switches the power transmitting path between the differential portion 11 (transmitting member 18) and the drive wheel 38 in a power transmitting condition allowing the power transmission therethrough, and a power interrupting condition interrupting the power transmission therethrough. That is, engagement of at least one of the first clutch C1 and the second clutch C2 bring the power transmitting path into the power transmitting condition, while release of both the first clutch C1 and the second clutch C2 bring the power transmitting path into the power interrupting condition.

In the automatic transmission portion 102, with release of release side engaging device and engagement of engage side engaging device, the clutch to clutch shifting is executed to selectively establish each of gear stages i.e., gear positions. Thus, gear ratio i.e. shifting ratio γ (=rotational speed N18 of transmitting member 18/rotational speed NOUT of output shaft 22) is obtained for each gear position.

For example, as shown for instance in FIG. 14, the first clutch C1 and the second brake B2 are coupled or engaged, which establishes the 1st-gear position having the highest gear ratio γ1 of, for instance, about 2.804. With the first clutch C1 and the first brake B1 being coupled, a 2nd-gear position is established with a gear ratio γ2 of, for instance, about 1.531 that is lower than that of the 1st-gear position. With the first clutch C1 and the second clutch C2 being coupled, a 3rd-gear position is established with a gear ratio γ3 of, for instance, about 1.000 that is lower than that of the 2nd-gear position.

With the second clutch C2 and the second brake B2 being coupled, a reverse-gear position is established with a gear ratio γR of, for instance, about 2.393 that is intermediate between those of the 1st-gear and 2nd-gear positions. In addition, for the neutral "N" state to be established, for instance, with all the first clutch C1, the second clutch C2, the first brake B1 and the second brake B2 uncoupled or disengaged. Here, the coupling operation of the coupling device of the automatic transmission portion 102 in the 4-th gear position is the same as the third gear position.

In the thus-configured transmission mechanism 100, the differential portion 11 that serves as the continuously variable transmission and the automatic shifting portion 102 construct continuously variable transmission. By controlling the shifting ratio of the differential portion 11 to be constant, the differential portion 11 and the automatic shifting portion 102 can provide the same function as the step variable transmission.

Specifically, the differential portion 11 serves as the continuously variable transmission, and the automatic shifting portion 102 coupled to the differential portion 11 in series serves as the step variable transmission. Accordingly, rotational speed inputted into at least one gear stage of the automatic shifting portion 102 (hereinafter referred to as "the input rotational speed of the automatic shifting portion 102"), that is, the rotational speed of the transferring member 18 continuously varies. Thus, a continuously variable shifting ratio width, i.e., spread can be provided at that gear stage. As a result, the transmission mechanism 100 can continuously provide the total shifting ratio γT, thereby serving as the continuously variable transmission.

For example, the transferring member rotational speed N18 continuously varies for each of the first to third speed gear stages and the reverse gear stage of the automatic shifting portion 102 shown in an engagement table of FIG. 14, to provide the continuously variable shifting ratio width for each of the gear stages. Accordingly, with the shifting ratio can continuously varying among the adjacent gear stages, the continuously variable total shifting ratio γT is rendered for the transmission mechanism 100 as a whole.

In addition, the shifting ratio of the differential portion 11 is controlled so as to be constant, and the clutches C and the brakes B are selectively and operatively engaged. As a result, the total shifting ratios γT of the transmission mechanism 100 varying geometrically can be rendered for each of the gear stages. This selective engagement of the clutches C and the brakes B provides the first to third speed gear stages and the reverse gear stage. Consequently, the transmission mechanism 100 can establish the same state as the step variable transmission.

For example, when the differential portion 11 is controlled to have the gear ratio γ0 "1", as shown in the engagement table of FIG. 14, the total gear ratio γT of the transmission mechanism 100 corresponding to each of gear stages of the automatic transmission portion 102 including the first to third gear positions and rearward gear position can be obtained. In the third gear position of the of the automatic transmission portion 102, when the differential portion 11 is controlled to have the gear ratio γ0 smaller than "1", for example about "0.7", the total gear ratio γT for example about "0.705" which is smaller than the fourth gear position can be obtained shown in the engagement table of FIG. 14.

FIG. 15 shows a collinear chart representing relative relations on the rotating speeds of the rotary elements coupled in differing states for the intended gear positions in the shifting mechanism 100, respectively. The shifting mechanism 100 is structured with the differential portion 11 and the automatic transmission portion 102.

In FIG. 15, the automatic transmission portion 102 operates on four vertical lines Y4, Y5, Y6 and Y7 corresponding to fourth to seventh rotary element s RE4 to RE7 in order from the left, respectively. The fourth rotary element (fourth element) RE4 represents that the second and third sun gears S2 and S3 are connected to each other. The fifth rotary element (fifth element) RE5 corresponds to the third carrier CA3. The sixth rotary element (sixth element) RE6 represents that the second carrier CA2 and the third ring gear R3 are connected to each other. The seventh rotary element (seventh element) RE7 corresponds to the second ring gear R2. Further, in the automatic transmission portion 102, the fourth rotary element RE4 is selectively connected to the transmitting member 18 via the second clutch C2 and selectively connected to the case 12 via the first brake B1. The fifth rotary element RE5 is selectively connected to the case 12 via the second brake B2. The sixth rotary element RE6 is connected to the output shaft 22 of the automatic transmission portion 102. The seventh rotary element RE7 is selectively connected to the transmitting member 18 via the first clutch C1.

The automatic transmission portion 102 operates in a manner as shown in FIG. 15. That is, with both the first clutch C1 and the second brake B2 being coupled, an intersection point between an inclined linear line L1 and the vertical line Y6 represents the rotating speed of the output shaft 22 in the 1st-speed position. The inclined linear line L1 passes across an intersection point between the vertical line Y7 indicative of the rotating speed of the seventh rotary element (seventh element) RE7 (R2) and the horizontal line X, and an intersection point between the vertical line Y5 indicative of the rotating speed of the fifth rotary element RE5 (CA3), and a horizontal line X1. The vertical line Y6 represents the rotating speed of the sixth rotary element (sixth element) RE6 (CA2, R3) connected to the output shaft 22.

Likewise, an intersection point between an inclined linear line L2 determined with both the first clutch C1 and the first brake B1 being coupled, and the vertical line Y6 indicative of the rotating speed of the sixth rotary element RE6 connected to the output shaft 22, represents the rotating speed of the output shaft 22 in the 2nd-speed position. An intersection point between a horizontal linear line L3 determined with both the first clutch C1 and the second clutch C2 being coupled, and the vertical line Y6 indicative of the rotating speed of the sixth rotary element RE6 connected to the output shaft 22, represents the rotating speed of the output shaft 22 in the 3rd-speed position.

When power from the differential portion 11 is inputted to the seventh rotary element RE7 with a speed higher than the engine speed, if the straight line L0 is set in the state as shown in FIG. 15 in the differential portion 11, the rotating speed of the output shaft 22 in the fourth-speed position is represented by an intersection point between a horizontal line L4 and the vertical line Y6. Here, the horizontal line L4 is determined by engagement of the first clutch C1, and second clutch C2, and the vertical line Y6 indicates the rotating speed of the sixth rotary element RE6 fixed to the output shaft 22.

Also in the Embodiment 2, since the transmission mechanism 100 is comprised of the differential portion 11 and the automatic transmission portion 102, the same effect as the above Embodiment 1 can be obtained.

Embodiment 3

Figure 16:
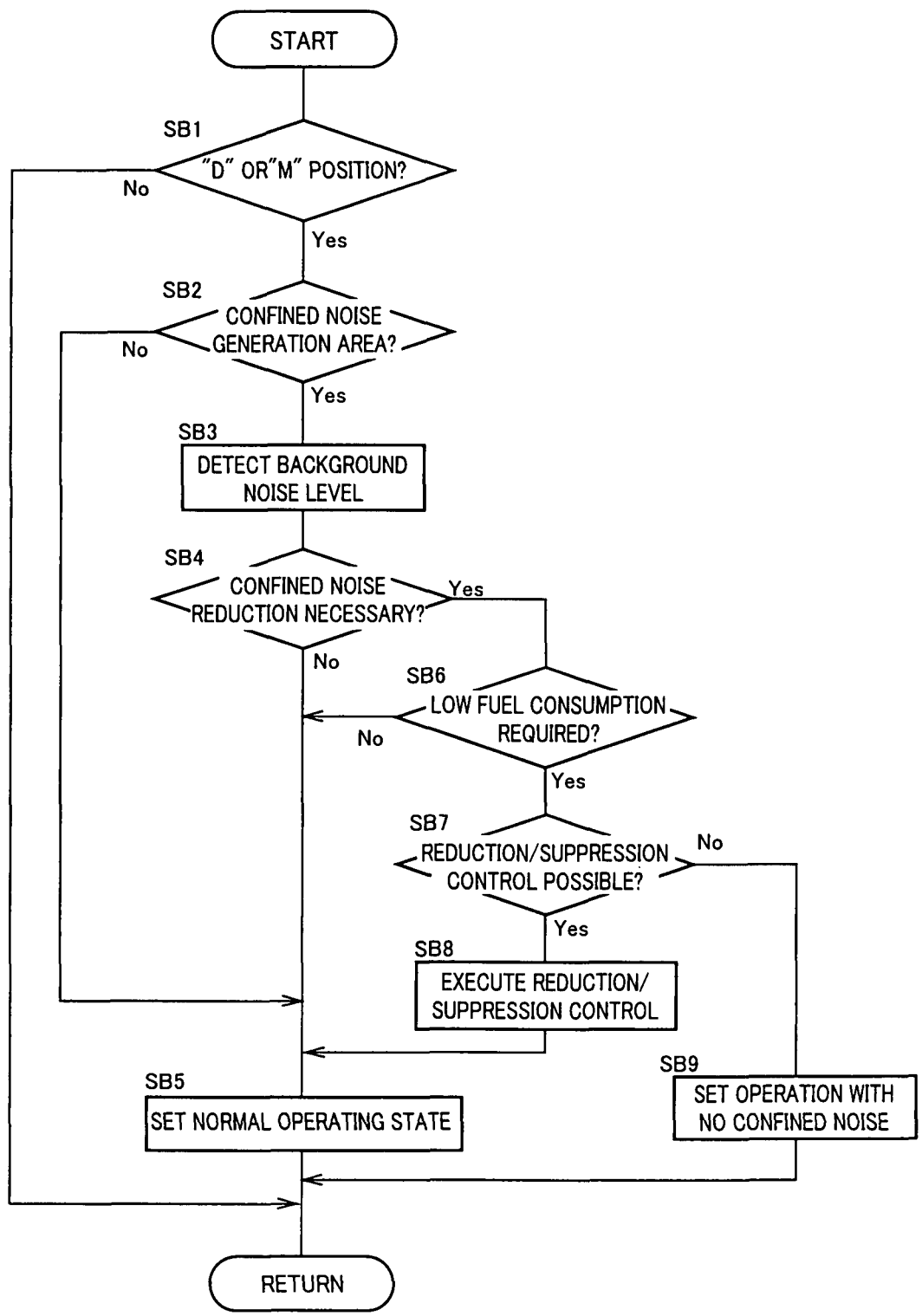
FIG. 16 is a flowchart explaining the state of a control operation in the electronic control device shown in FIG. 4 according to another embodiment, and corresponding to FIG. 8.

Embodiment 3 is now described with reference to FIG. 16 and the like. FIG. 16 is a flow chart explaining the main part of the control operation of the electronic control device 40 according to a third embodiment, that is, control by the confined noise reduction means 98 that reduces the confined noise. For example, the illustrated sequence is repeatedly executed in a very short cycle time period of approximately several milliseconds to several tens of milliseconds. The sequence shown in FIG. 16 corresponds generally to that shown in FIG. 8. The dissimilarity i.e., difference between the flowcharts shown in FIG. 8 and FIG. 16 resides that Step SB6 is provided between Step SB4 corresponding to Step SA4 of FIG. 8 and Step SB7 corresponding to Step SA6 in the flow chart shown in FIG. 16. Steps SB1, SB2, SB3, SB4, SB5, SB7, SB8 and SB9 correspond to Steps SA1, SA2, SA3, SA4, SA5, SA6, SA7 and SA8, respectively.

In the Embodiment 3, the confined noise reduction means 98 also principally includes the electric motor determining means 92, the electric motor control means 94, and the rotational speed control means 96. The confined noise reduction means 98 executes confined noise reduction if the comparison means 84 determines that (i) the confined noise is not lost in the background noise and that the level LA of the background noise is not high compared with level LK of the confined noise, such that the confined noise is obtrusive, and (ii) if the low fuel consumption requirement determining means 88 determines that the driver does not issue the low fuel consumption requirement to operate the vehicle in low fuel consumption mode. The dissimilarity between the Embodiment 1 the Embodiment 3 resides in the operation that reduces the confined noise caused by the variation of torque that is provided from the engine 6.

That is, even when the comparison means 84 determines that the level LA of the background noise is not high compared with level LK of the confined noise, if the low fuel consumption requirement determining means 88 determines that the driver issues the low fuel consumption requirement for operating the vehicle in low fuel consumption mode, the confined noise reduction means 98 does not execute confined noise reduction.

In Step SB6 corresponding to the low fuel consumption requirement determining means 88, it is determined whether the driver has issued the low fuel consumption requirement to operate the vehicle in low fuel consumption mode. For example, the determination is made based on a signal that outputted from a low fuel consumption requirement switch that is operated by the driver to issue the low fuel consumption requirement. If YES is the determination of Step SB6, in other words, if the driver issues confined noise reduction requirement by the confined noise reduction means 98 that may reduce fuel efficiency, confined noise reduction control is executed in Step SB7 and later. Conversely, if NO is the determination of Step SB6, in other words, if the driver has not issued the confined noise reduction requirement but intends the low fuel consumption requirement, the confined noise reduction control is not executed. That is, Step SB5 is executed to instead provide a high fuel efficiency operating state.

In the Embodiment 3, only if the confined noise detection means 80 detects a confined noise, the electric motor control means 94 executes control, so that the second electric motor M2 outputs torque TM2 with variation in opposite phase to the variation of torque of the engine 6 to suppress the variation of torque of the engine 6. Accordingly, it is not necessary to change an operation line, and possible to prevent fuel efficiency reduction.

In addition to this, the level of the confined noise detected by the confined noise detection means 80 is compared with the level of the background noise detected by the background noise detection means 82. Only if the former is higher than the latter, the confined noise reduction means 98 executes confined noise reduction. That is, control is not always executed upon detection of the confined noise, but is executed only when the confined noise causes a problem. Therefore, it is possible to minimize the loss of energy to be used for electric motor control.

According to the Embodiment 3, if the low fuel consumption requirement determining means 88 determines that the driver issues the low fuel consumption requirement, the electric motor control means 94 does not execute electric motor control. Therefore, the fuel efficiency of the internal combustion engine is not reduced. In addition to this, even if the electric motor determining means 92 determines that the charge amount SOC of the electric power storage device 50 is insufficient, in other words, that the electric motor control cannot be executed due to a voltage drop, an electric power shortage or the like, the rotational speed control means 96 adjusts the rotational number NE of the engine 6 into the non-confined noise generating operation area not generating the confined noise. Thus, confined noise generation is suppressed.

This is because the rotational speed control means 96 serves as the shifting ratio control means that adjusts the shifting ratio of the transmission mechanism 10 so that the rotational speed NE of the engine 6 falls within a non-confined noise generating operation area. That is, since the shifting ratio of the transmission mechanism 10 of the vehicle is adjusted using the rotational speed control means 96, it is possible to easily adjust the rotational speed NE of the engine 6 to fall within the non-confined noise generating operation area Consequently, generation of confined noise can be suppressed.

Although the Embodiments 1 to 3 according to the present invention are described above with reference to the drawings, the present invention can be applied to other modes.

In the Embodiments 1 to 3, the confined noise reduction means 98 includes the electric motor control means 94, the electric motor determining means 92, and the rotational speed control means 96. However, the confined noise reduction means 98 may include only the electric motor control means 94, and may not include the electric motor determining means 92 or the rotational speed control means 96. In this case, it is also possible to provide some degree of beneficial effect.

The aforementioned confined noise detection means 80 determines whether the confined noise is generated based on whether the operating state of the vehicle, that is, the combination of the vehicle speed V and the output torque TE, falls within the confined noise generating area D shown in the shifting diagram of FIG. 6, for example. However, the present invention is not limited to this. For example, a microphone can be installed in the vehicle as the confined noise detection means to detect actual confined noise. Alternatively, a vibration sensor can be installed in the engine as the confined noise detection means to detect the variation of torque of the engine that causes the confined noise.

Generation of the confined noise may be detected based on whether the combination of the engine rotational speed NE and the output torque TE comprising the operating state of the vehicle lies on an equivalent fuel consumption curve Y and falls within the confined noise generating area C shown in FIG. 10, for example. The level of variation of rotation comprising torsional vibration of a propeller shaft or drive shaft and having a strong correlation with confined noise generation may be detected. Alternatively, whether or not the operating state of the vehicle reaches the resonance area of the engine system of the vehicle may be detected.

Although the aforementioned background noise detection means 82 detects the level of background noise by means of the microphone installed in the vehicle, the present invention is not limited to this. For example, the operational state of an air-conditioner may be detected based on an ON/OFF signal, and the operational state of an audio device may be detected by means of an audio switch or a volume switch, so that the level of the background noise is estimated based on the level of noise that is generated by the air-conditioner and the audio device. The levels of background noise may be previously experimentally measured and stored in association with the levels of noise that are generated by the air-conditioner and the audio device. That is, the levels of the noise that are generated by devices that mainly cause background noise may be previously calculated by an experiment or a simulation so as to estimate the levels of background noise generated by the devices in actual use.

The aforementioned confined noise reduction means 98 executes confined noise reduction if the comparison means 84, comparing the level LK of the confined noise with the level LA of background noise, determines that the level LA of background noise does not reach a level at which the confined noise will be lost in the background noise. However, the confined noise reduction means 98 is not limited to this. For example, the confined noise reduction means may execute confined noise reduction if the level LK of the confined noise is deemed obtrusive relative to the level LA of the background noise based oh the comparison by the comparison means 84.

If the level LK of the confined noise detected by the confined noise detection means 80 is at a certain level, the confined noise reduction means 98 may execute confined noise reduction. Conversely, when the low fuel consumption requirement determining means 88 determines that the driver has issued the low fuel consumption operation requirement, the confined noise reduction means 98 may only execute confined noise reduction if the level LK of the confined noise greatly exceeds the level LA of the background noise.

Although the low fuel consumption requirement determining means 88 determines the low fuel consumption operation requirement of the driver by means of the low fuel consumption requirement switch installed in the vehicle, the present invention is not limited to this. For example, the low fuel consumption requirement determining means 88 may determine the low fuel consumption operational requirement of the driver based on historical operation data such as historical driver's accelerator operation data.

The electric motor determining means 92 determines to cause the electric motor control means 94 to execute control if the charge amount SOC of the electric power storage device 50 is not less than a predetermined value A, and to cause the rotational speed control means 96 to execute control if the charge amount SOC of the electric power storage device 50 is less than the predetermined value A. However, instead of or in addition to the electric motor determining means 92, the determination may be made based on whether the electric motor can be controlled in very low temperature conditions, for example. That is, the determination may be made based on conditions that influence whether the electric power storage device 50 can output electric power to the second electric motor M2. In addition to this, control may be executed based on whether the second electric motor M2 is weather in an operative state, for example, in an overheated state.

That is, the determination may be made to cause the rotational speed control means 96 to execute control if the second electric motor M2 cannot operate, and to cause the electric motor control means 94 to execute control if the second electric motor M2 can operate. The determination may be made to cause the rotational speed control means 96 to execute control if the driver requires a given torque output, and to cause the electric motor control means 94 to execute control if the driver does not require a given torque output.

The electric motor control means 94 detects the variation of the output torque of the engine 6, and calculates the variation of torque in opposite phase to the variation of output torque of the engine 6, so as to control the second electric motor M2 to provide torque with the variation in opposite phase to the variation of output torque of the engine 6. However, the present invention is not limited to this. The electric motor control means 94 may predict the variation of the output torque of the engine 6, and may calculate the variation of torque in opposite phase to that predicted variation of the output torque of the engine 6, so as to control the second electric motor M2 to output the torque with the variation in opposite phase to the predicted variation of the output torque of the engine 6.

When the rotational speed control means 96 adjusts the combination of the rotational speed NE and the output torque TE of the engine 6, comprising the engine operating state, the rotational speed control means 96 adjusts the combination of the rotational speed NE and the output torque TE of the engine 6 to a point that lies on the equivalent power curve Z but spaced a predetermined amount away from the rim of the confined noise generation area C as shown in FIG. 10, for example. However, the rotational speed control means 96 is not limited to this. For example, the combination of the rotational speed NE and the output torque TE of the engine 6 may be changed along the equivalent power curve Z so as to be spaced away from the confined noise generation area C. In this case, when actual confined noise is not detected, or when actual confined noise is lost in the background noise, the changed combination of the rotational speed NE and the output torque TE of the engine 6 may be specified as an adjusted engine operating state.

When the rotational speed control means 96 adjusts the combination of the rotational speed NE and the output torque TE of the engine 6, comprising the engine operating state, a point that represents the adjusted operating state is adjusted to lie on the equivalent power curve Z that passes through a point A which is not adjusted. However, in addition to this, the degree of electronic throttle opening (not shown) may be adjusted to provide the same driving force to the vehicle before and after adjustment. In this case, passengers in the vehicle do not get a shock when the operating state is adjusted.

The rotational speed control means 96 adjusts the speed gear stage of the automatic shifting portion 20 of the transmission mechanism 10 to adjust the engine rotational speed NE. However, the rotational speed control means 96 is not limited to this. For example, the rotational speed control means 96 may adjust the shifting ratio of the differential portion 11 as a continuously variable shifting portion, or both the shifting ratios of the automatic shifting portion 20 and the differential portion 11 to adjust the engine rotational speed NE. That is, the rotational speed control means 96 may adjust the total shifting ratio $\gamma T$ of the transmission mechanism 10 as a whole to adjust the engine rotational speed NE so that the operating state of the engine 6 shifts out of the confined noise operating area.

In the Embodiment 3, if it is determined that the driver has issued the low fuel consumption requirement in Step SB8 in FIG. 16 corresponding to the low fuel consumption requirement determining means 88, the confined noise prevention means 98 (Steps SB8 and SB9) does not operate. If it is not determined that the driver has issued the low fuel consumption requirement, the confined noise prevention means 98 (Steps SB8 and SB9) operates.

However, the low fuel consumption requirement determining means 88 is not limited to this. For example, the low fuel consumption operating requirement by the driver may be determined stepwise. For example, the levels may include a level at which low fuel consumption operation is strongly required, a level at which low fuel consumption operation is required to some extent, and a level at which low fuel consumption operation is not required. On the level at which low fuel consumption operation is strongly required, the confined noise prevention means 98 does not operate (Steps SB8 and SB9) are not executed. On the level at which low fuel consumption operation is required to some extent, one of the electric motor control means 94 and the rotational speed control means 96 operates. On this level, whichever of the electric motor control means 94 and the rotational speed control means 96 less affects fuel efficiency will operate. On the level at which low fuel consumption operation is not required, whichever of the electric motor control means 94 and the rotational speed control means 96 more affects fuel efficiency will operate.

In the Embodiments 1 to 3, in confined noise prevention control by the confined noise prevention means 98, the electric motor control means 94 (Step SA7 or SB8) or the rotational speed control means 96 (Step SA8 or SB9) operates.

However, the confined noise prevention means 98 is not limited to this. Both means 94 and 96 may operate at the same time, or alternatively if one of means 94 and 96 cannot provide a sufficient effect, the other means may operate in addition to the one means.

FIG. 17 is an exemplary timing chart showing the state where both the electric motor control means 94 and the rotational speed control means 96 operate at the same time. FIG. 17 corresponds to FIG. 11. Similar to the case of FIG. 11, at time t1, the confined noise detection means 80 (Step SA2) detects the generation and the level LK of the confined noise. The background noise detection means 82 (Step SA3) starts operating at time t2, to detect the level LA of background noise from time t2 to time t3. At time t3, the comparison means 84 (Step SA4) determines that the level LA of the background noise is lower than the level LK of the confined noise shown by a chain double-dashed line in FIG. 11, which means that the confined noise is accordingly not lost in the background noise. In this case, the confined noise reduction means 98 executes confined noise reduction.

In the confined noise reduction means 98, the electric motor control means 94 controls the second electric motor M2 to output torque TM2 with variation in opposite phase to the variation of the engine torque TE. At the same time, the rotational speed control means 96 executes control to provide instruction for shifting the automatic shifting portion 20 as the step variable transmission from the first speed gear stage currently selected to the second speed gear stage, for example.

In this case, the rotational speed control means 96 changes the operating state of the engine 6. Also, in the period from time t3 until the operating state of the engine 6 shifts out of the confined noise generation area, the electric motor control means 94 eliminates variation of the generated engine torque, and the rotational speed control means 96 completes the shifting operation of the speed shifting stage of the automatic shifting portion 20. After the operating state of the engine 6 leaves the confined noise generation area, the confined noise will not be generated, thereby operation of the electric motor control means 94 being not required.

In the power distribution mechanisms 16 in the illustrated Embodiments 1 to 3, the first carrier CA1 is fixed to the engine 6, and the first sun gear S1 is fixed to the first electric motor M1, and the first ring gear R1 is fixed to the transmitting member 18. However, such connecting arrangement is not essential, and the engine 8, first electric motor M1 and transmitting member 18 are fixed to respective ones of the three elements CA1, S1 and R1 of the first planetary gear set 24.

In the illustrated Embodiments 1 to 3, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18.

The hydraulically operated friction engaging device such as the first clutch C1 and the second clutch C2 may be an engaging device of a magnetic-powder type, an electromagnetic type or a mechanical type, such as a powder (magnetic powder) clutch, an electromagnetic clutch and a meshing type dog clutch.

In the illustrated Embodiments 1 to 3, the automatic transmission portion 20, 102 is disposed in the power transmitting path between the transmitting member 18 serving as the output member of the differential portion 11, that is the power distributing mechanism 16 and the drive wheels 38. However, a power transmitting device of the other type such as, for instance, a continuously variable transmission (CVT) which is one kind of the automatic transmission, a first type manual transmission or a second type manual transmission can be employed. The first manual transmission of a well-known constantly meshed type includes two parallel shafts, and is automatically switched the gear positions thereof by the select ring and the shift cylinder. The second manual transmission of a synchronously meshed type is so constructed that the gear positions thereof is manually switched. Other type of the power transmitting device (transmission) can be employed.

When other type of the power transmitting portion different from the automatic transmission portion 20, 102, the engaging device operative to switch the power transmitting path into the power trasmissivie state or the power interrupted state can be disposed in a power transmitting path to the power transmitting portion, or a power transmitting path between the power transmitting portion and the drive wheels.

In the illustrated Embodiments 1 to 3, while the automatic transmission portion 20, 102 is connected to the differential portion 11 in series via the transmitting member 18, a countershaft may be provided in parallel to the input shaft 14 to allow the automatic transmission portion 20, 102 to be coaxially disposed on an axis of the countershaft. In this case, the differential portion 11 and the automatic transmission portion 20, 102 are connected to each other in power transmitting capability via a set of transmitting members structured of, for instance, a counter-gear pair acting as the transmitting member, a sprocket and a chain.

The power distributing mechanism 16 in the illustrated Embodiments can be comprised of for example a pinion driven and rotated by the engine, and a differential gear set having a pair of bevel gears meshed with the pinion being operatively connected to the first electric motor M1 and the second electric motor M2.

The power distributing mechanism 16 in the illustrated embodiment comprised of one paired planetary gear units, may be comprised of two or more pairs planetary gear units to function in the non-differential state (fixed speed state) as the transmission having three or more speed positions. The planetary gear unit is not limited to the single-pinion type, but can be the double-pinion type. The switch device 46 in the illustrated embodiment has the shift lever 48 to be manipulated for selecting one of a plurality of shift positions. However, instead of such shift lever 48, following switch or device can be employed. That is, a switch being comprised of a pressing type switch and a sliding type switch and being selected to one of a plurality of shift positions; a device being selected to one of a plurality of shift positions in response not to the manipulation by the hand but to the driver's voice; and a device being selected to one of a plurality of shift positions in response to the manipulation by the foot, can be employed.

In the illustrated embodiment, the shifting range is established by manipulation of the shift lever 48 to the "M" position, but the shifting position i.e., speed position can be established by setting of the shifting step that is the maximum speed step for each shifting range. In this case, in the automatic transmission portion 20, 72, the shifting position is switched for executing the shifting action. For example, when the manual manipulation of the shift lever 48 to a shift-up position "+" and a shift-down position "−" at the "M" position is executed, any of the first gear position to the fourth gear position is set by the manipulation of the shift lever 48 in the automatic transmission portion 20.

It will be apparent to those skilled in the art that various changes and modifications can be made to the present invention without departing from the spirit or scope thereof in addition to the foregoing embodiments.

What is claimed is:

1. A control device for a vehicle driving apparatus that includes an internal combustion engine and an electric motor, the control device comprising:

confined noise reduction means that controls said electric motor, to reduce confined noise caused by variation of torque outputted from said internal combustion engine, so that the electric motor outputs variation of torque in opposite phase to the variation of the torque outputted from said internal combustion engine, wherein said confined noise reduction means is configured to control said electric motor if the confined noise caused by said variation of the torque is larger than background noise detected by background noise detection means, and wherein if a driver issues a low fuel consumption requirement, said confined noise reduction means does not control said electric motor.

2. The control device for a vehicle driving apparatus according to claim 1, wherein said confined noise reduction means includes a rotational speed control means that, if said electric motor cannot operate, adjusts the rotational speed of said internal combustion engine into a non-confined noise generating operation area not generating the confined noise, within an operating area in which the internal combustion engine can operate.

3. The control device for a vehicle driving apparatus according to claim 2, wherein said control device further includes an automatic transmission that is arranged on a power transmission path that transfers the output of said internal combustion engine and said electric motor to driving wheels, wherein said rotational speed control means changes the shifting ratio of said automatic transmission so that the rotational speed of said internal combustion engine falls within said non-confined noise generating operation area.

4. The control device for a vehicle driving apparatus according to claim 3, wherein said automatic transmission includes a differential portion as a continuously variable shifting portion, and an automatic shifting portion as a step variable shifting portion.

5. The control device for a vehicle driving apparatus according to claim 4, wherein said control device changes the shifting ratio of said continuously variable shifting portion or the gear stage of said automatic shifting portion, or changes both the shifting ratio and the gear stage, to change the shifting ratio of said automatic transmission as a whole.

6. The control device for a vehicle driving apparatus according to claim 1, wherein said confined noise reduction means includes an electric motor control means that, if said electric motor can operate, controls said electric motor to output the variation of torque in opposite phase to the variation of the torque outputted from said internal combustion engine.

7. The control device for a vehicle driving apparatus according to claim 1, wherein said confined noise reduction means compares the confined noise detected by confined noise detection means with the background noise detected by background noise detection means, and controls said electric motor if the level of the background noise is at a level at which the confined noise is serious.

8. The control device for a vehicle driving apparatus according to claim 1, wherein said confined noise reduction means controls said electric motor, if a shift lever installed in a vehicle is set at the D or M position.

* * * * *